Figure 13:
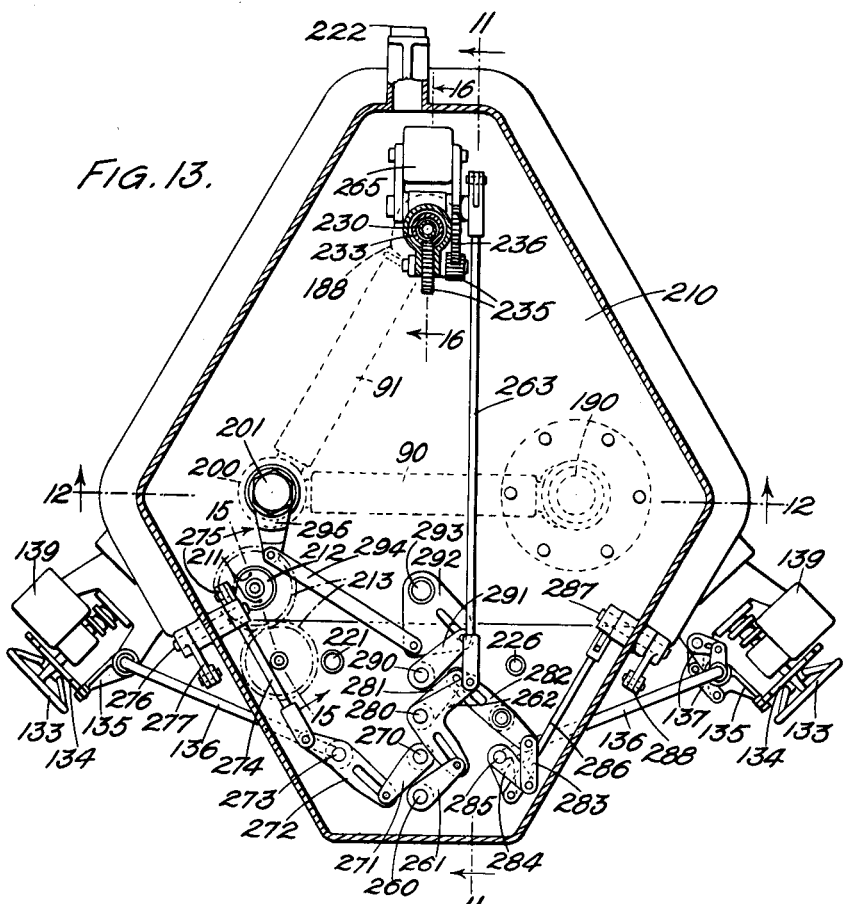

Feb. 12, 1935.　　　　　A. ALLAN　　　　　1,990,853
METAL CLAD ELECTRIC SWITCH GEAR
Filed Nov. 8, 1933　　17 Sheets-Sheet 1
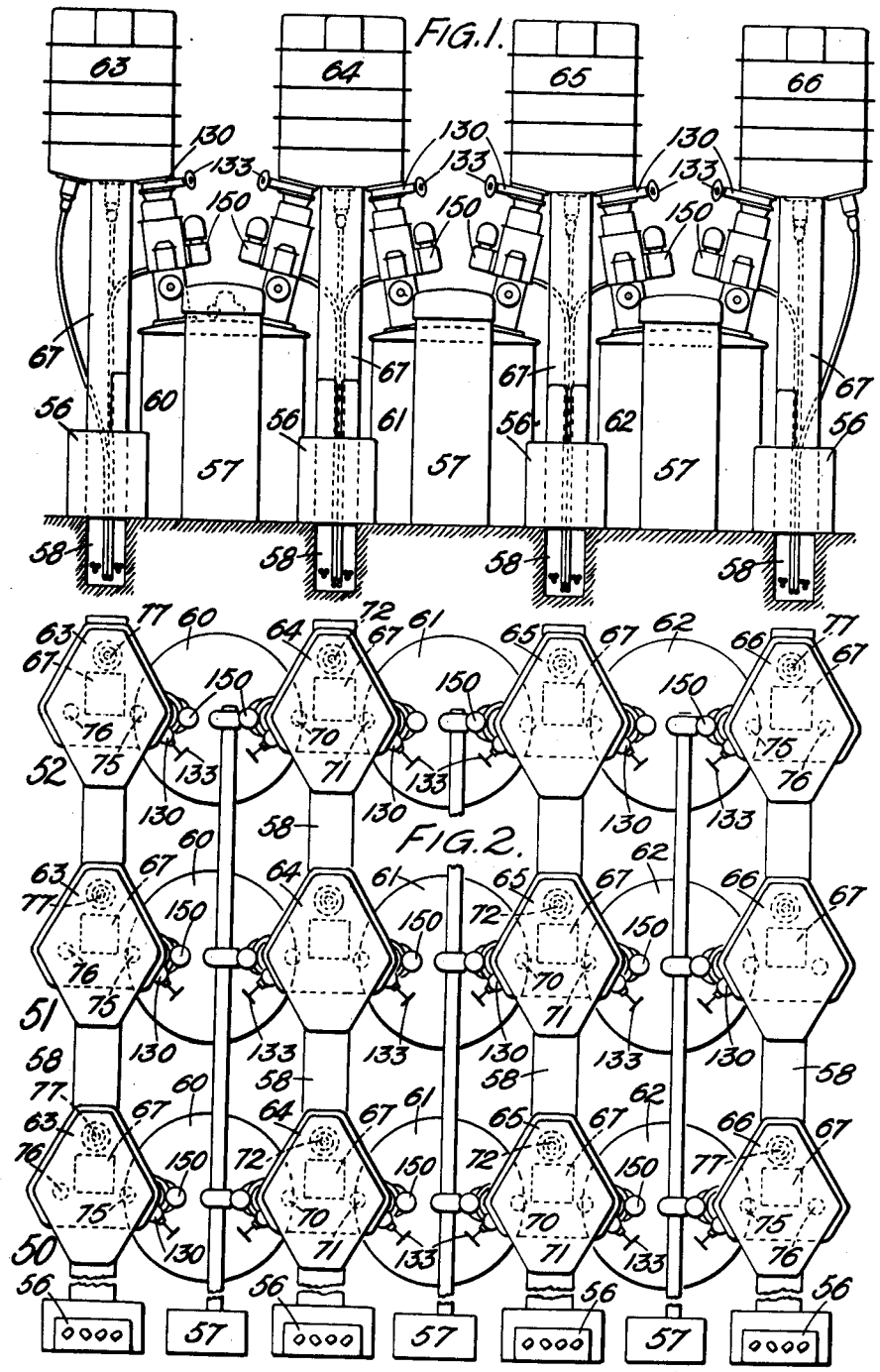

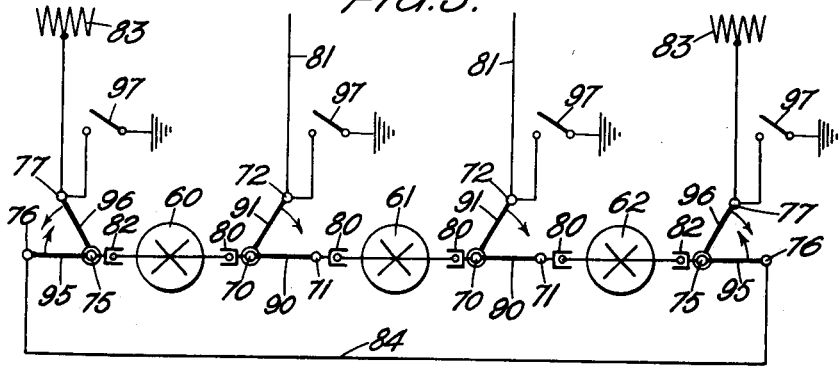
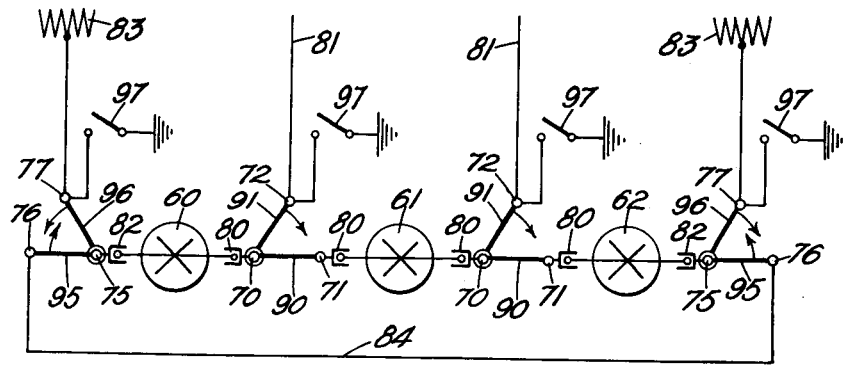
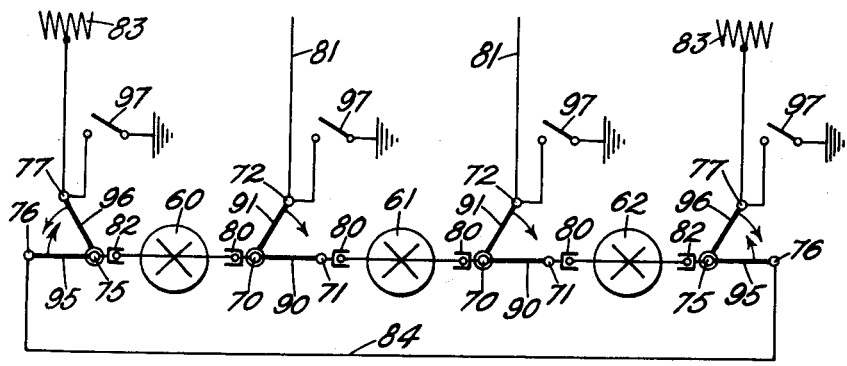

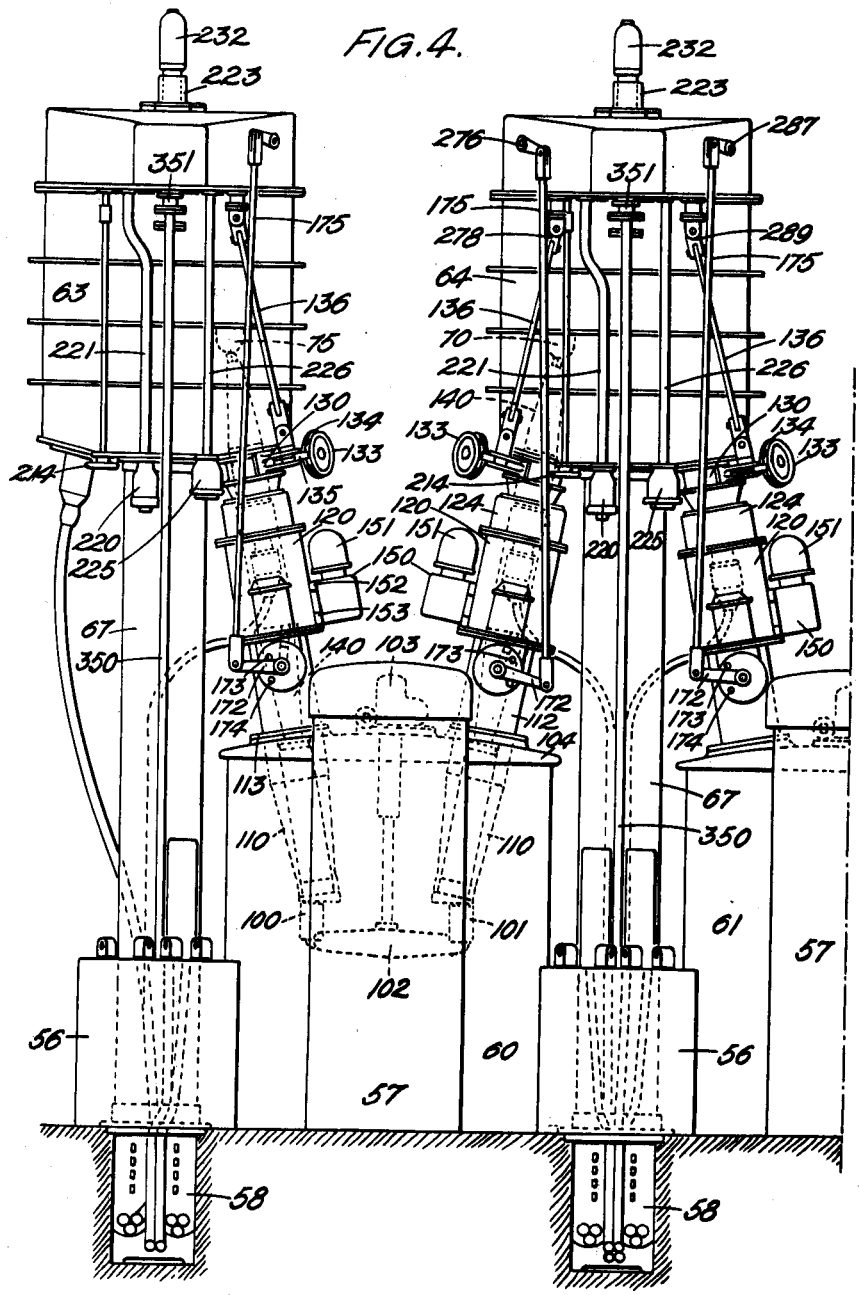

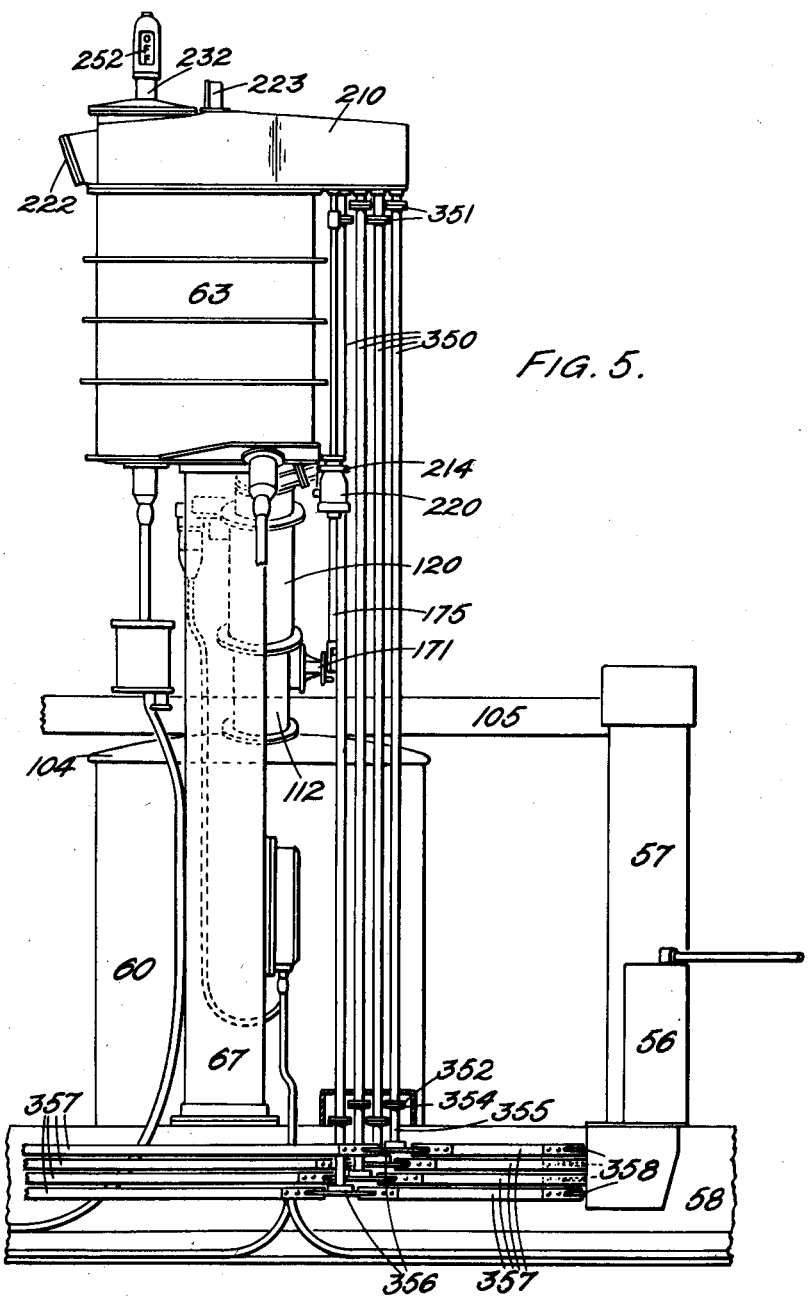

Feb. 12, 1935.　　　　　　A. ALLAN　　　　　　1,990,853
METAL CLAD ELECTRIC SWITCH GEAR
Filed Nov. 8, 1933　　　17 Sheets-Sheet 5
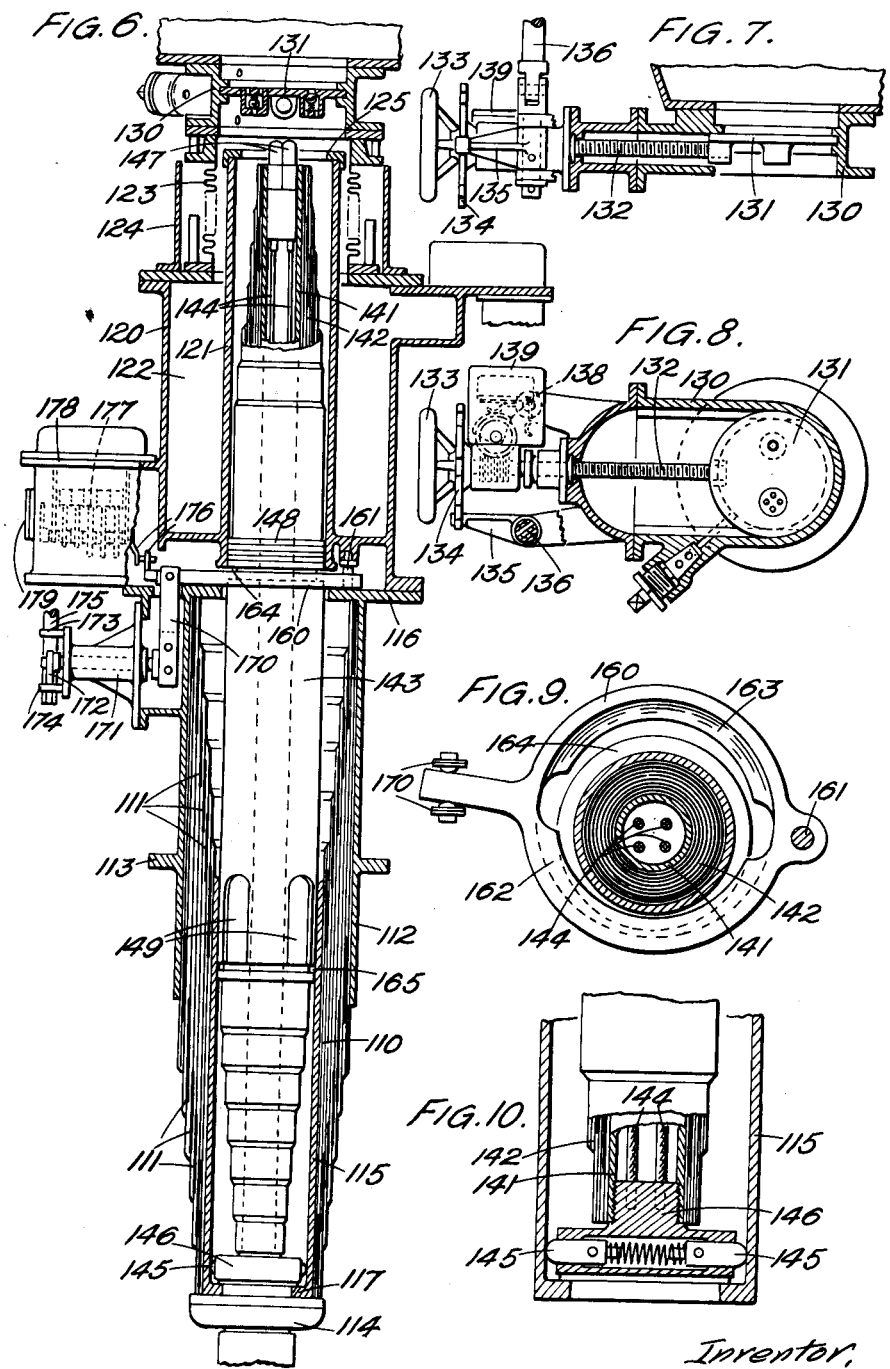

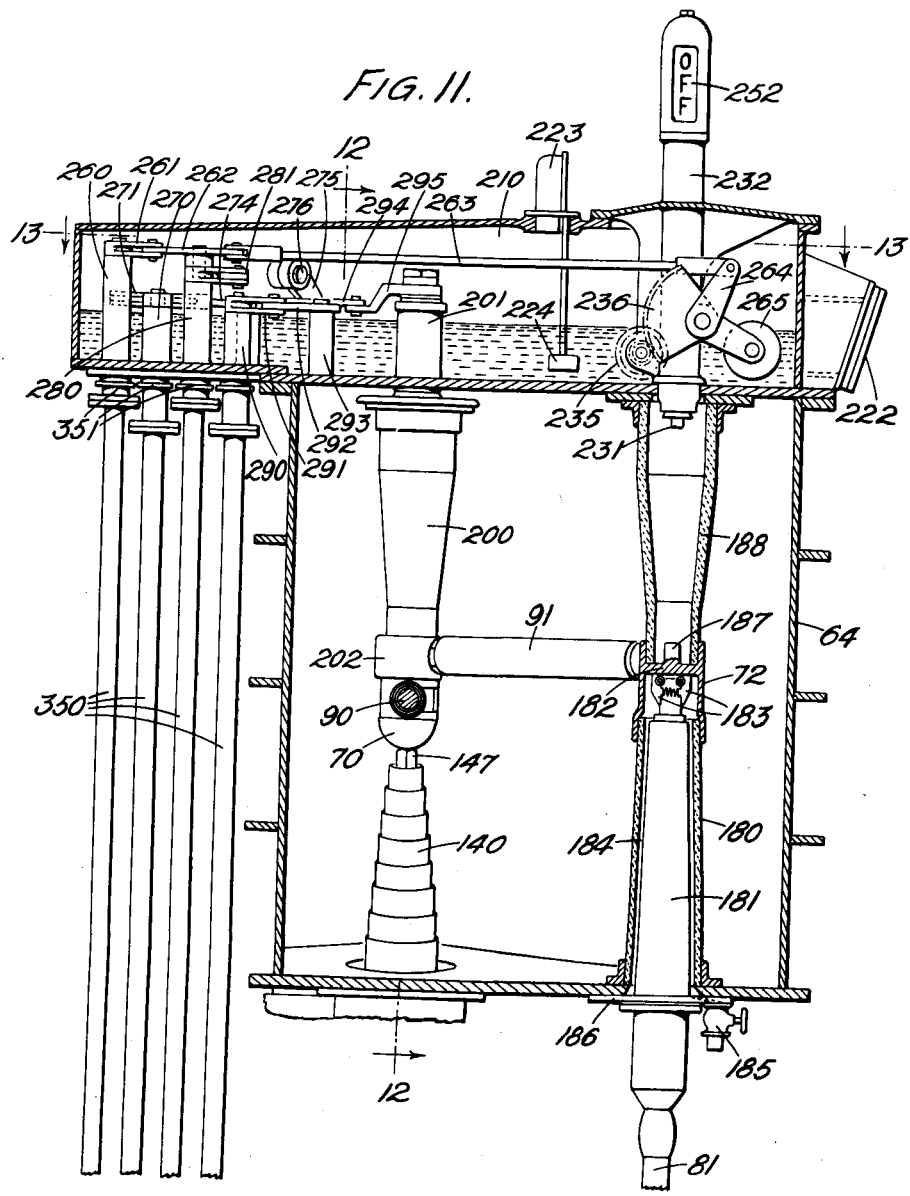

Feb. 12, 1935.  A. ALLAN  1,990,853
METAL CLAD ELECTRIC SWITCH GEAR
Filed Nov. 8, 1933   17 Sheets-Sheet 7
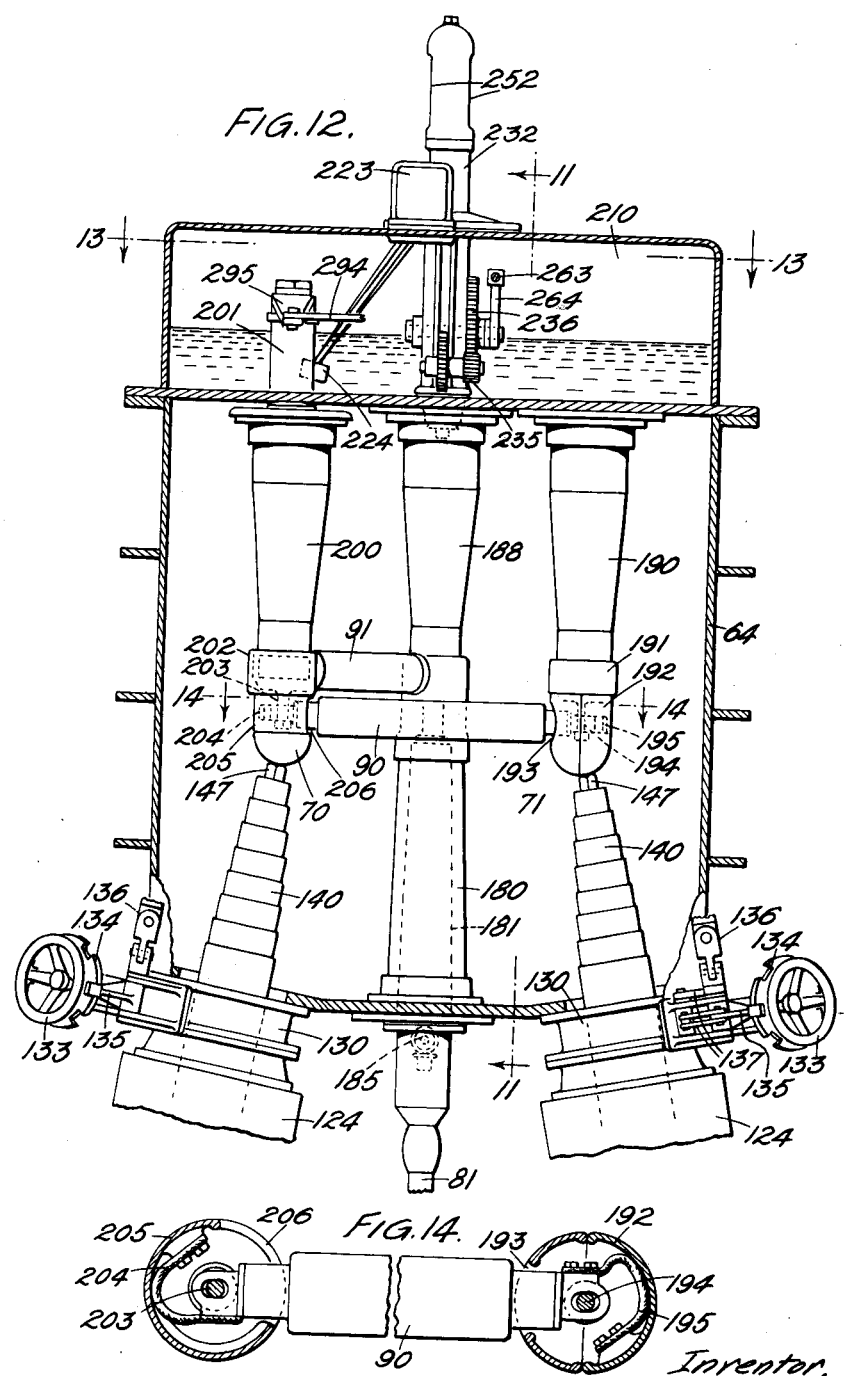

Feb. 12, 1935.  A. ALLAN  1,990,853
METAL CLAD ELECTRIC SWITCH GEAR
Filed Nov. 8, 1933   17 Sheets-Sheet 9

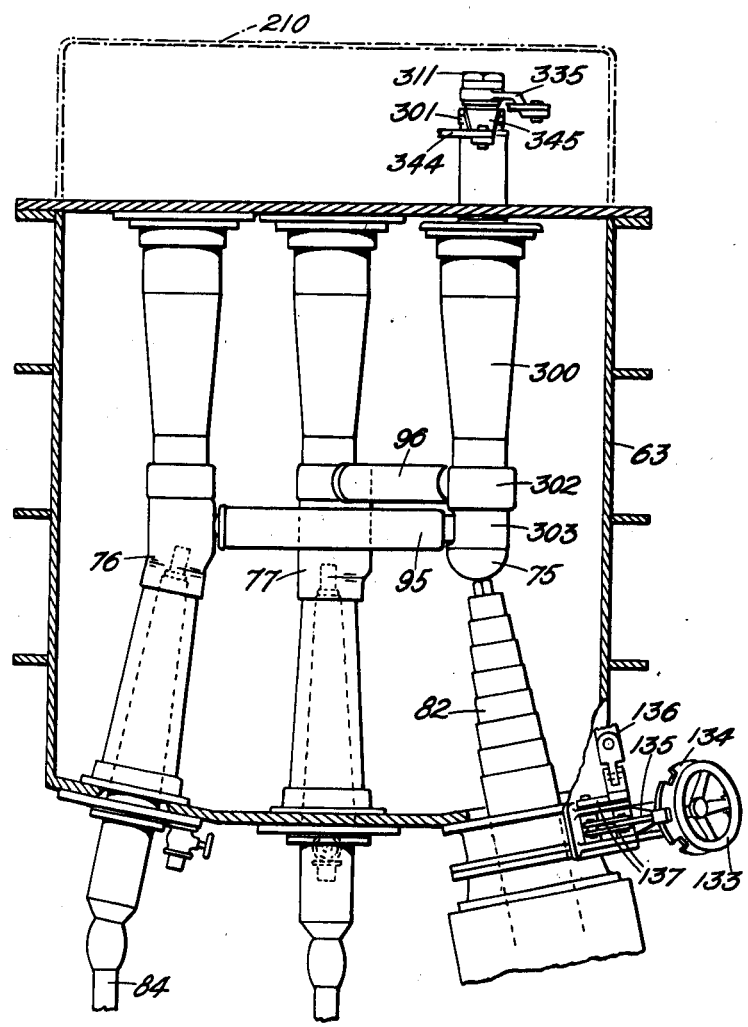

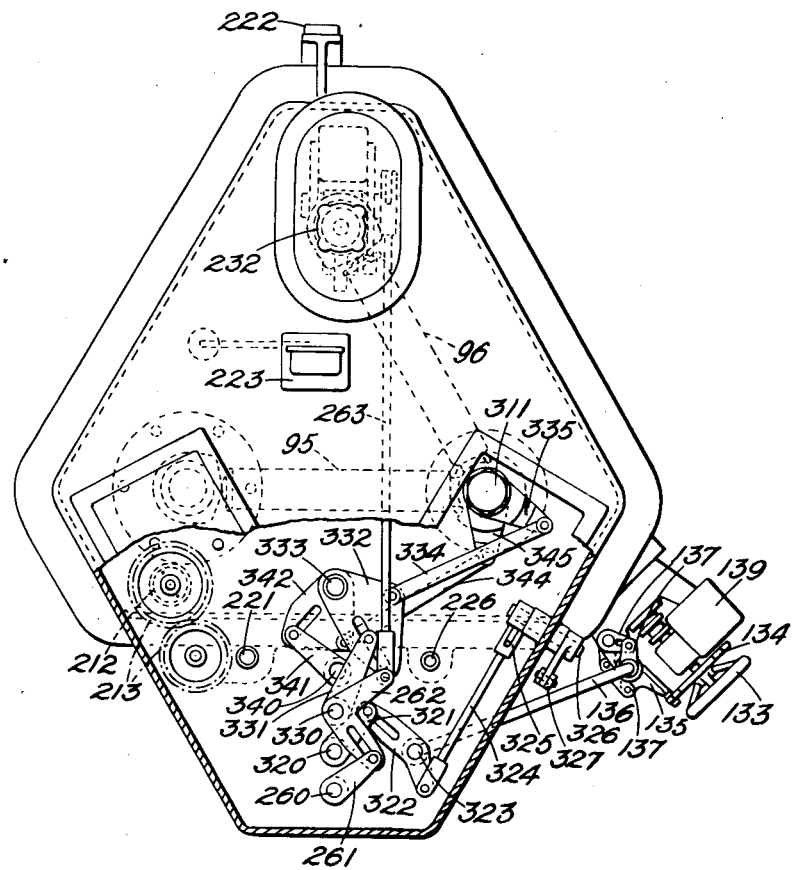

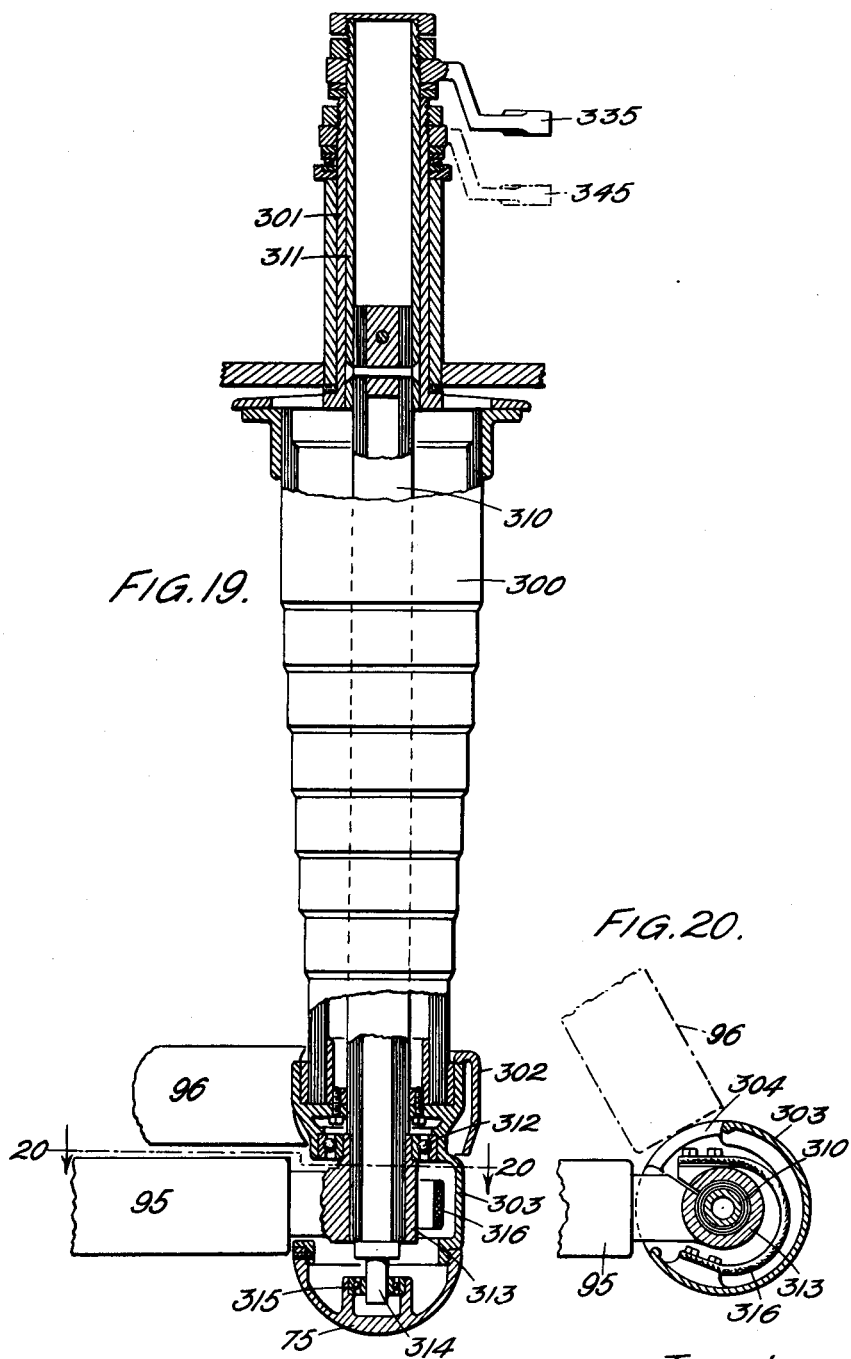

Feb. 12, 1935.  A. ALLAN  1,990,853
METAL CLAD ELECTRIC SWITCH GEAR
Filed Nov. 8, 1933    17 Sheets—Sheet 13

Inventor,
A. Allan,

Feb. 12, 1935.　　　　A. ALLAN　　　　1,990,853
METAL CLAD ELECTRIC SWITCH GEAR
Filed Nov. 8, 1933　　17 Sheets-Sheet 14

Feb. 12, 1935.　　　　A. ALLAN　　　　1,990,853
METAL CLAD ELECTRIC SWITCH GEAR
Filed Nov. 8, 1933　　　17 Sheets-Sheet 16

Feb. 12, 1935.  A. ALLAN  1,990,853
METAL CLAD ELECTRIC SWITCH GEAR
Filed Nov. 8, 1933  17 Sheets-Sheet 17

Inventor,
A. Allan,
Per,
Watson, Coit, Morse & Grindle
Attys.

Patented Feb. 12, 1935

1,990,853

UNITED STATES PATENT OFFICE 1,990,853

METAL-CLAD ELECTRIC SWITCH GEAR

Archibald Allan, Tynemouth, England, assignor to A. Reyrolle & Company Limited, Hebburn-on-Tyne, England, a registered company of Great Britain Application November 8, 1933, Serial No. 697,208 In Great Britain November 17, 1932

33 Claims. (Cl. 175—298)

This invention relates to metal-clad electric switchgear, for example for controlling high voltage power transmission circuits, and is more particularly concerned with the arrangement of the isolating switch chambers utilized in such gear in association with the main circuit-breakers.

The invention has for its primary object to provide an improved practical construction of switchgear, whereby considerable economy can be effected both in cost and in the space occupied by the gear, whilst maintaining complete safety in the operation and handling of the gear. Whilst applicable to other purposes, the invention is especially of advantage in providing a compact and relatively inexpensive metal-clad switchgear arrangement, which may be used to replace the open type switchgear hitherto employed in outdoor substations, such for example as duplicate supply substations on high voltage power transmission ring main networks.

A more detailed object of the invention is to provide a convenient arrangement of the switches in the isolating switch chambers and of the connections to the contacts therein, which will enable the space occupied by such connections to be reduced to a minimum.

A further object of the invention is to provide improved means for maintaining the isolating switch chambers filled with oil or other insulating liquid and for permitting the expansion and contraction of the liquid as the result of temperature changes.

Another object of the invention is to enable the size of the isolating switch chambers to be reduced to a minimum by the use of insulating barriers in the oil or other insulating liquid therein.

Still further objects of the invention will be apparent from the appended claims and from the accompanying drawings, which illustrate a preferred arrangement wherein the invention is applied to three-phase switchgear at a duplicate supply substation on a high voltage ring main.

In the drawings—

Figures 1 and 2 are respectively a front elevation and a plan showing the general lay-out of the whole switchgear, Figure 3 is a circuit diagram of the arrangement, Figure 4 is a front elevation of part of the switchgear on a larger scale, Figure 5 is a side elevation of the gear on the same scale as Figure 4, Figure 6 is an enlarged sectional view showing the arrangement of one of the withdrawable conductors, Figures 7-10 are detached sectional views on a larger scale of parts of Figure 6, Figures 11, 12 and 13 are three sectional views at right angles to one another of one of the intermediate isolating switch chambers, the sections being taken respectively on the lines 11—11, 12—12 and 13—13 indicated in these figures, Figure 14 is a partial horizontal section on the line 14—14 of Figure 12 on an enlarged scale.

Figure 15:
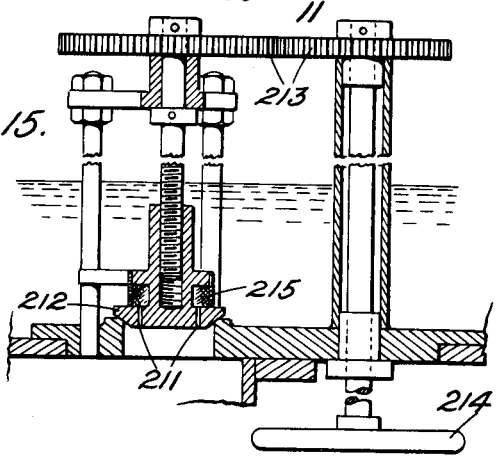
Figure 16:
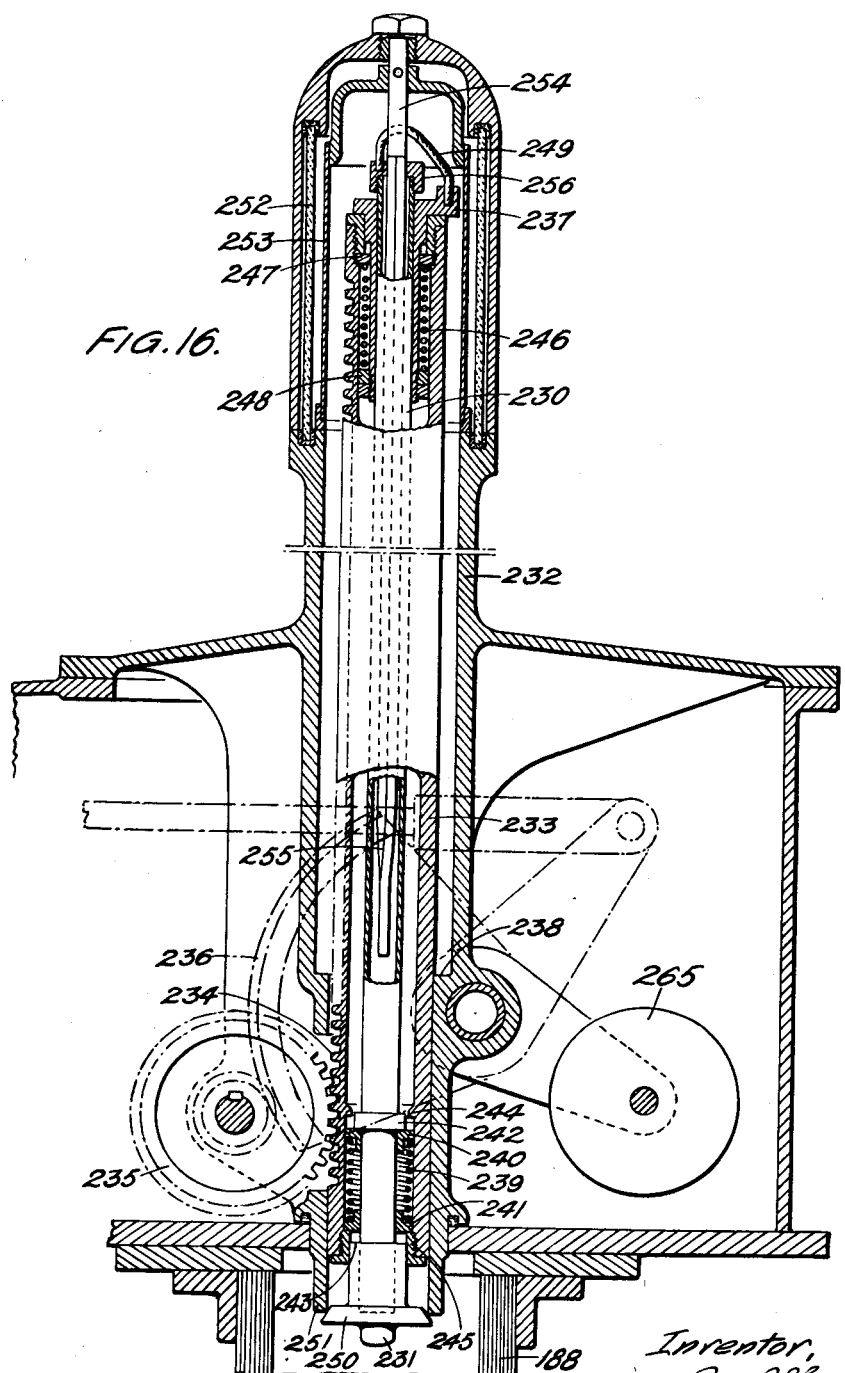

Figures 15 and 16 are partial vertical sections respectively on the lines 15—15 and 16—16 of Figure 13 on an enlarged scale.

Figure 21:
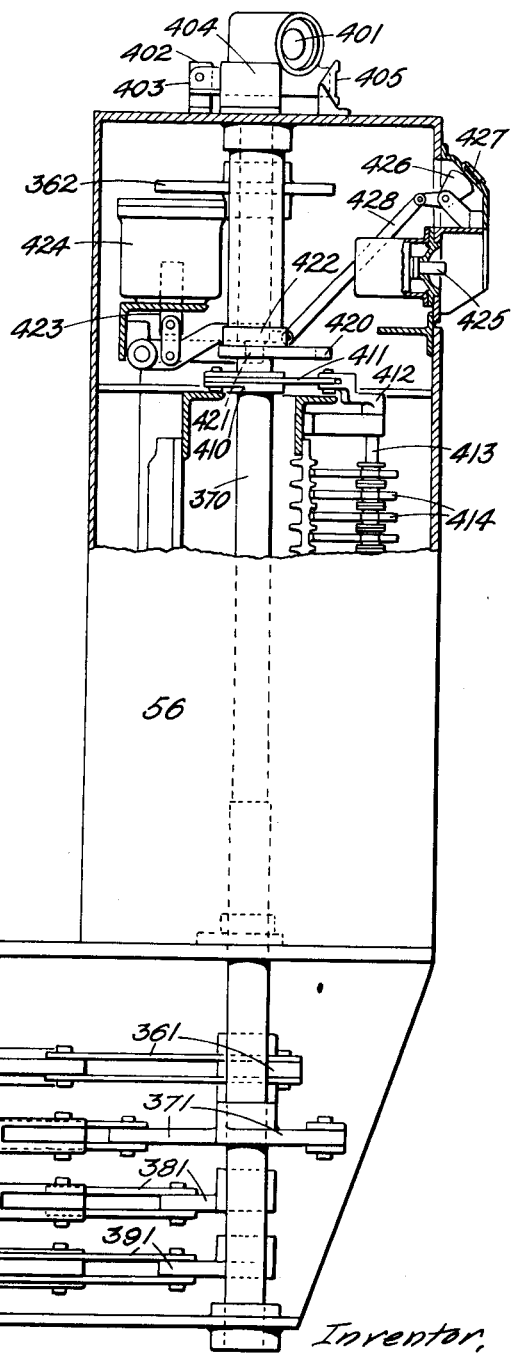
Figure 22:
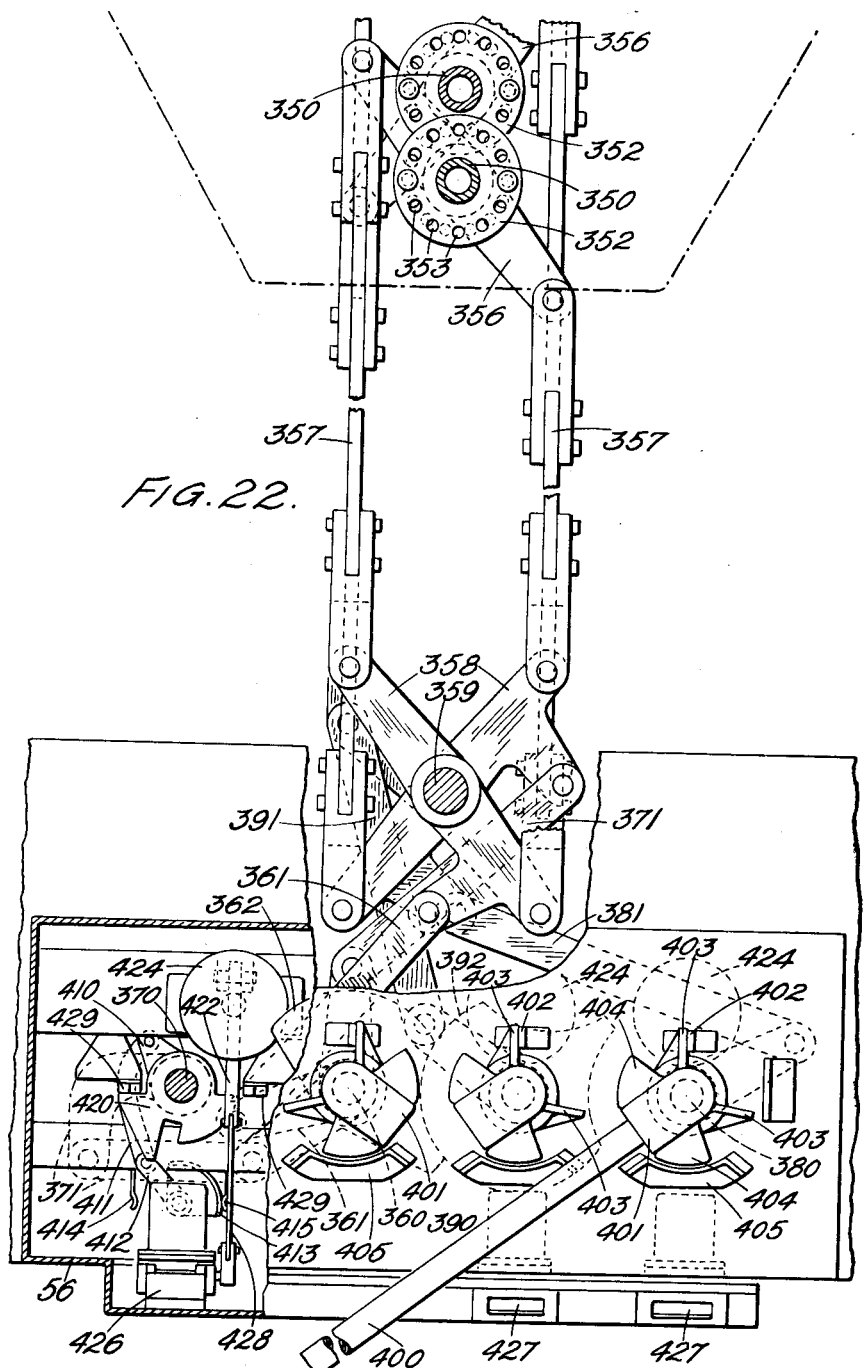
Figure 23:
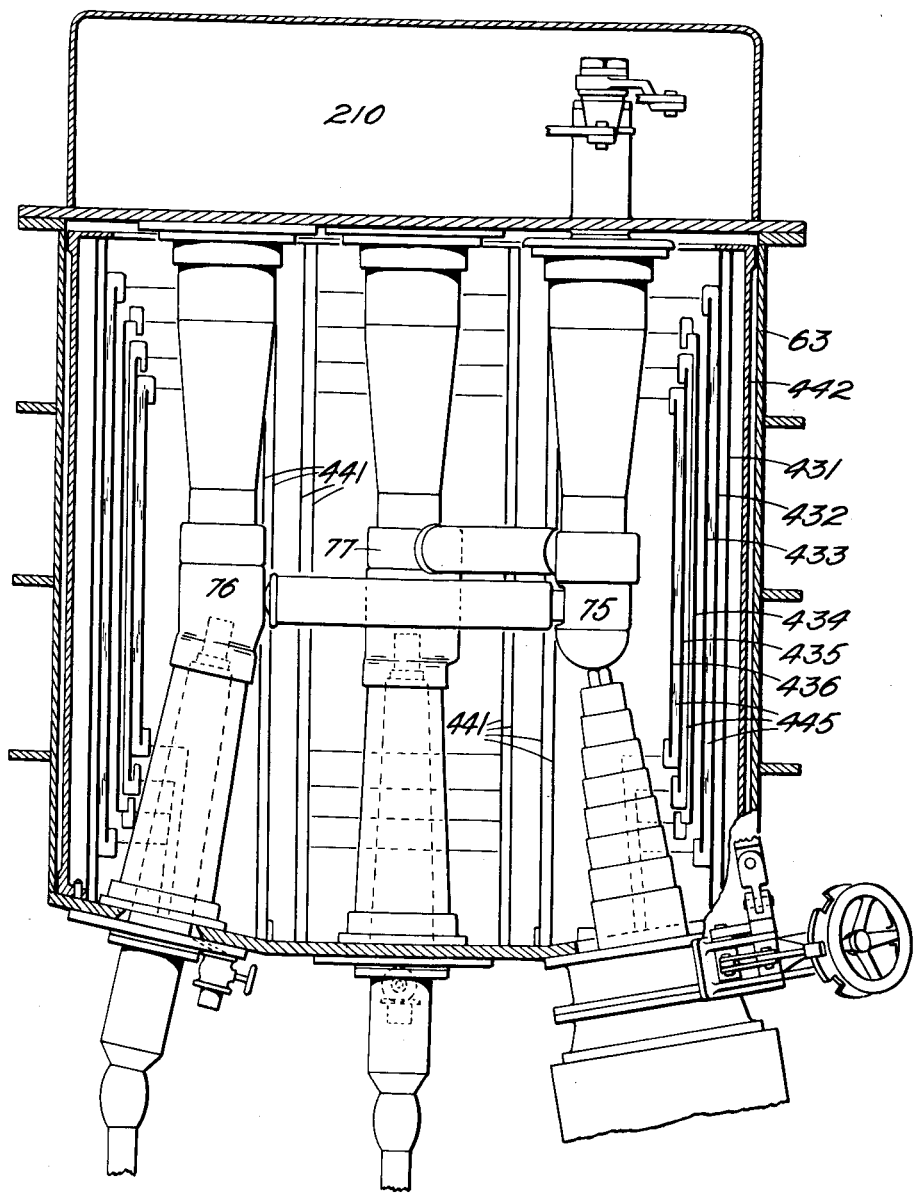
Figure 24:
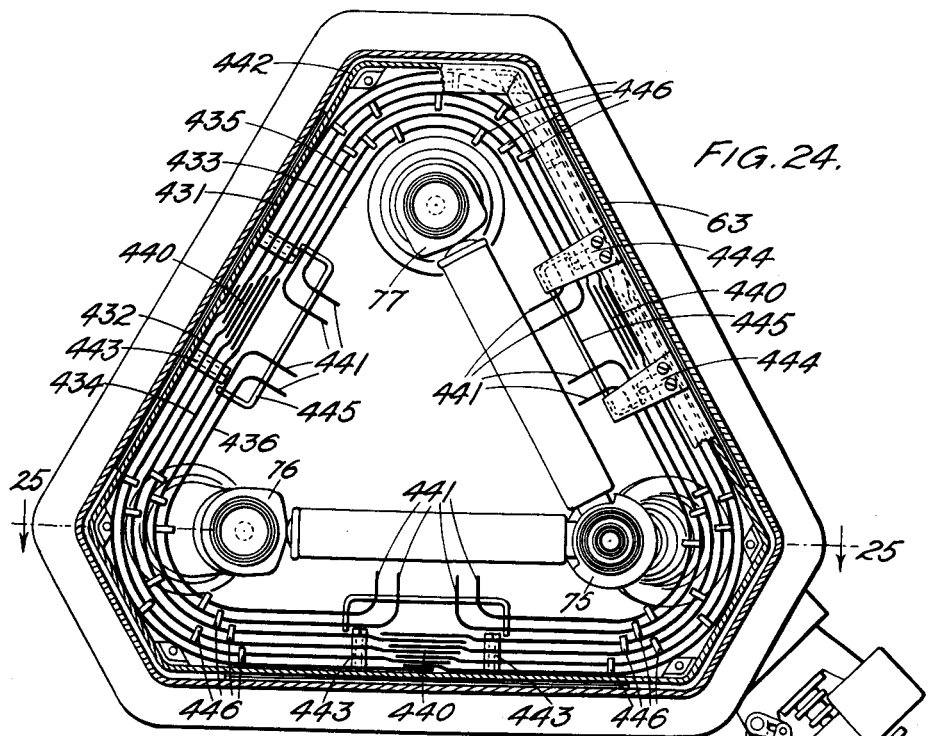
Figure 25:
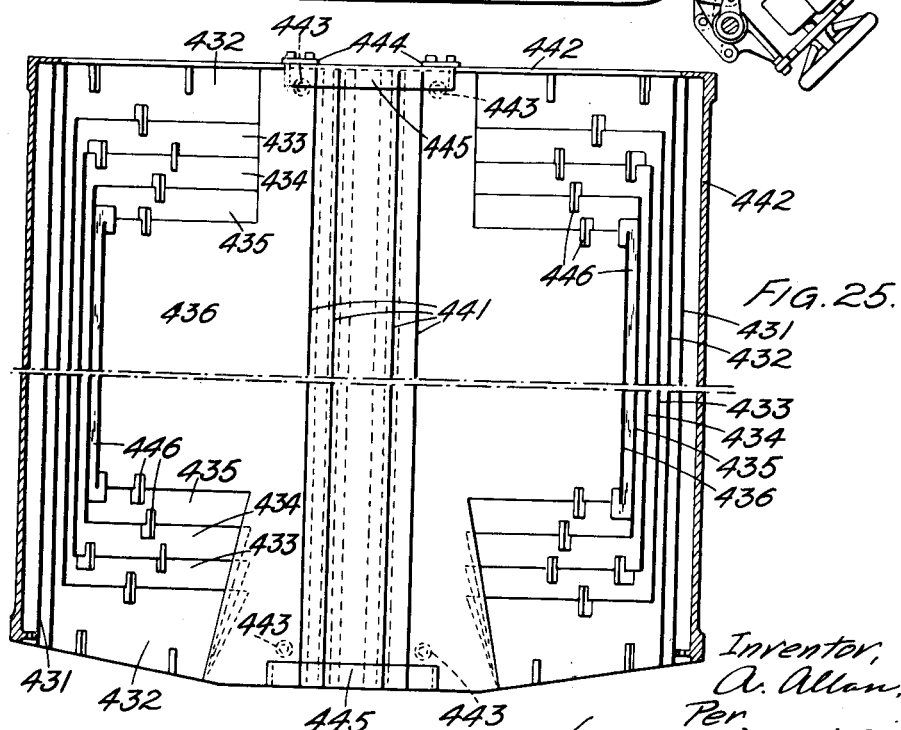
Figure 26:
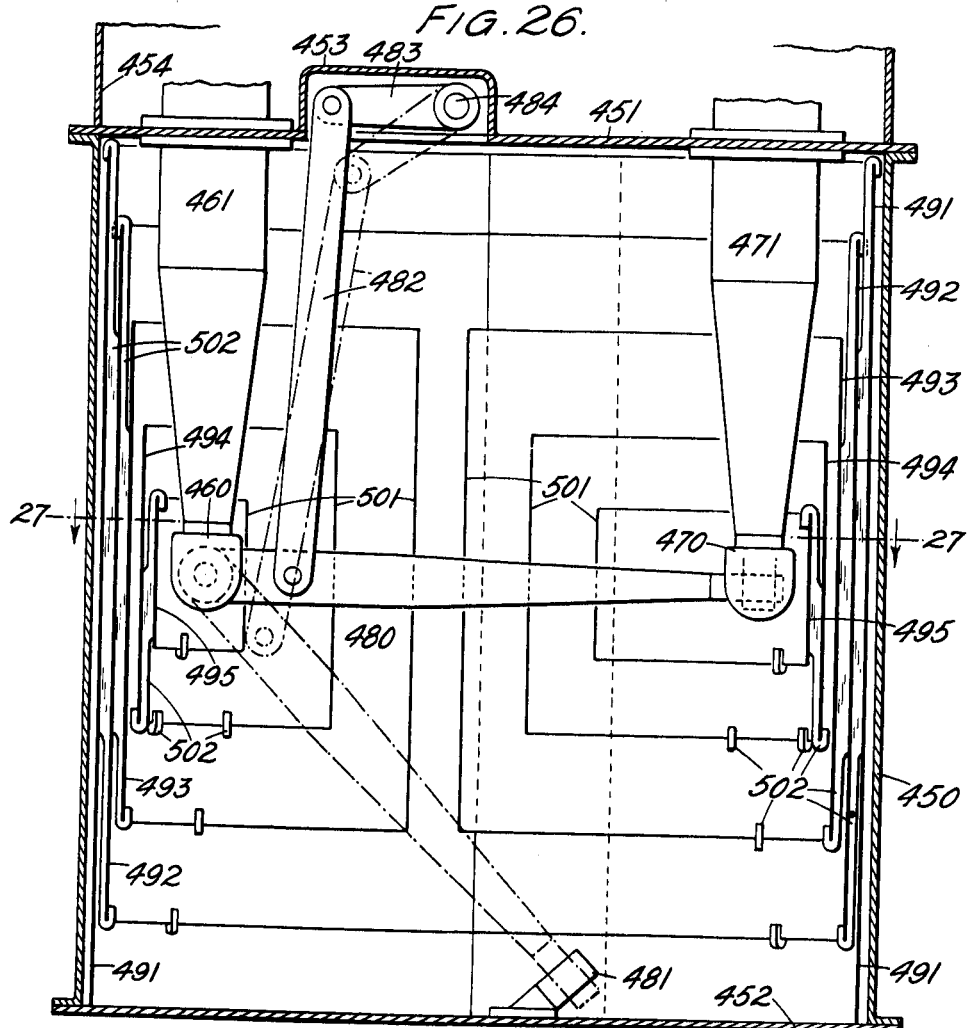
Figure 27:
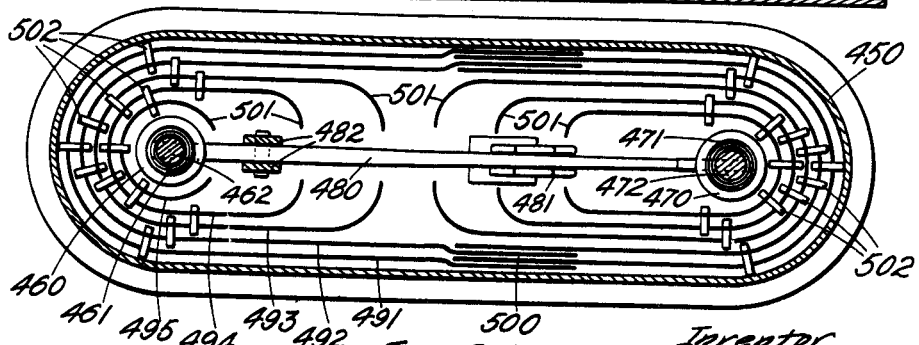

Figures 17 and 18 are views similar to those of Figures 12 and 13 of the left-hand end isolating switch chamber, Figure 19 shows partly in section the arrangement of the double rotary isolating switch employed in the end chamber shown in Figures 17 and 18, Figure 20 is a horizontal section on the line 20—20 of Figure 19, Figure 21 is a sectional side elevation of one of the pedestals containing the control mechanism for the isolating and other switches, Figure 22 is a plan of the pedestal shown in Figure 21, with parts broken away, Figure 23 is a view similar to that of Figure 17 of the left-hand end isolating switch chamber showing insulating barriers in position in the chamber, Figure 24 is a horizontal section through the isolating switch chamber shown in Figure 23, Figure 25 is a vertical section on the line 25—25 of Figure 24, viewed in the direction of the arrows showing the complete assembly of the insulating barriers detached from the isolating switch chamber, Figure 26 is a vertical sectional view showing the use of insulating barriers in an alternative construction of isolating switch chamber, and Figure 27 is a horizontal section on the line 27—27 of Figure 26.

In this arrangement single-phase main circuit-breakers are employed and the circuit-breakers and the associated parts of the switchgear are arranged in three parallel rows 50, 51, 52 (Figure 2), one behind the other, respectively corresponding to the three phases. The apparatus in each phase is similar to that in the other two phases and the corresponding parts of the gear in the various phases are arranged one behind the other, the main control mechanism, which is common to the three phases, being mounted in pedestals 56, 57 in a row across the front of the switchgear.

The apparatus in each phase comprises three main oil-immersed circuit-breakers with their tanks 60, 61, 62 resting on the ground, and four isolating switch chambers 63, 64, 65, 66 mounted on supporting pillars 67 above the level of the tops of the circuit-breaker tanks and alternating therewith. Thus there are two intermediate isolating switch chambers 64, 65 located between the circuit-breakers and two end isolating switch chambers 63, 66 located respectively at the two ends of the row of circuit-breakers.

As will be described in detail later, each isolating switch chamber consists of a vertically mounted metal casing, generally triangular in plan, with three equally spaced contacts 70, 71, 72 or 75, 76, 77 disposed near the corners of the triangle approximately midway in the height of the chamber. The connections to these contacts are taken through the base plate of the chamber and differ in the various chambers, the electrical circuits being shown in Figure 3.

Thus the first and second contacts 70, 71 of the two intermediate chambers 64, 65 are connected to the neighbouring main circuit-breaker contacts by means of longitudinally movable insulated conductors indicated at 80, whilst the third contacts 72 of these chambers are connected through cable sealing ends respectively to cables 81 constituting the two sides of the ring main. The two end chambers 63, 66 are also generally similar to one another, or more strictly are mirror images of one another, for the first contact 75 of the left-hand end chamber 63 is on the right-hand side of the chamber with the second contact 76 on the left, whilst in the other chamber 66 the first contact 75 is on the left-hand side. The first contacts 75 of the two end chambers are connected to the main circuit-breaker contacts by means of longitudinally movable insulated conductors 82, and the third contacts 77 of these chambers are connected through cable sealing ends to the cables leading respectively to the two supply transformers 83 of the substation, whilst the second contacts 76 of these two chambers are connected together through cable sealing ends and a by-pass cable 84. Thus the left-hand circuit-breaker 60 is connected between the first contacts 75 and 70 of the left-hand end chamber 63 and the left-hand intermediate chamber 64, the middle circuit-breaker 61 between the second contact 71 of the left-hand intermediate chamber 64 and the first contact 70 of the right-hand intermediate chamber 65, and the right-hand circuit-breaker 62 between the second contact 71 of the right-hand intermediate chamber 65 and the first contact 75 of the right-hand end chamber 66.

The connections between the contacts themselves in the isolating switch chambers are controlled in the case of the end chambers 63, 66 by two rotary isolating switches and in the case of the intermediate chambers 64, 65 by one rotary isolating switch and by a fixed connection. In each case the first contact 75 or 70 serves as the pivot for the rotary isolating switches. Thus in each intermediate chamber 64 or 65 the first and second contacts 70, 71 are permanently connected together by a rigid bar connection 90, and a rotary isolating switch arm 91 projects horizontally from the first contact 70 so that its free end can engage either with the second contact 71 or with the third contact 72. In each end chamber 63 or 66 two rotary isolating switch arms 95, 96 project horizontally, one above the other, from the first contact 75 and are so mounted that they can be rotated independently to bring their free ends into engagement with the second contact 76 or with the third contact 77. A cable earthing switch 97 is also provided between the third contact 72 or 77 in each chamber and a part of the earthed metal casing of the chamber. The operating mechanism for the rotary isolating switch or switches and for the cable earthing switch is located in a compartment extending over the top of the isolating switch chamber, this operating mechanism being operated from the appropriate main control pedestal 56 by connections housed in trenches 58 passing from the front to the back of the switchgear. These trenches 58 also serve to carry the cable from the various parts of the gear. The main control pedestals 57 contain the operating mechanism for the circuit-breakers.

The main circuit-breakers are arranged generally in the manner described in the present applicant's copending United States patent applications Serial Nos. 661,403, 661,404 and 661,405. Thus each circuit-breaker 60 or 61 or 62 comprises two fixed main contacts 100, 101 and a movable bridging contact member 102, the arrangement preferably being such as to give six breaks in series. The bridging contact member 102 is operated by suitable mechanism, indicated at 103, which is carried by the cover plate 104 of the oil tank 60 or 61 or 62 containing the circuit-breaker and is connected through the tube 105 to the main control pedestal 57.

Extending upwardly at a small angle to the vertical from each of the fixed main contacts 100, 101 of the circuit-breaker is a hollow condenser insulator 110, comprising short overlapping conducting layers 111 interleaved with insulating layers and surrounded in its upper portion by a metal sleeve 112, which projects through an orifice in the cover plate 104 of the tank and is provided with a flange 113 bolted to the cover plate. The lower end of each hollow insulator 110 is closed in an oil-tight manner by a metal cap 114 connected to the main fixed circuit-breaker contact 100 or 101, and a metal tube 115 extends up from this cap 114 within the lower portion of the insulator. At the upper end of each insulator the surrounding metal sleeve 112 carries a flange 116, to which is bolted a metal casing 120 including a cylindrical metal trunk 121 surrounded by an annular chamber 122 in which current transformers can be located. Around the upper end of the metal trunk 121 is a flexible metal bellows 123, which is attached to the top of the casing 120 and can be clamped to the bottom of a valve chest 130 mounted below the appropriate isolating switch chamber 63 or 64 or 65 or 66, a metal shield 124 being provided around the bellows 123 to protect it from damage. The first contact 70 or 75 (or the second contact 71 as the case may be) in the isolating switch chamber is in line with the axes of the metal trunk 121 and the hollow insulator 110, and communication between the chamber and the tubular compartment formed by the trunk and the insulator can be cut off by closing a sliding sluice valve 131 in the valve chest 130 in a manner to be described later.

Mounted to slide longitudinally in this tubular compartment is an insulated conductor 140, which serves when in its operative position to connect the contact in the isolating switch chamber to the inner metal tube 115 in the insulator 110 and thence to the main circuit-breaker contact 100 or 101, the sluice valve 131 being open. This insulated conductor comprises a rigid central tube 141 surrounded by insulation 142, which in the case of the higher voltage installations is in the form of condenser insulation as shown, the insulation being enclosed for part of its length by an outer metallic sheath 143, which engages with the metal trunk 121. The central tube 141 serves to contain flexible connections 144 between contacts at the upper and lower ends of the insulated conductor. The lower contacts (see Figure 10) are in the form of outwardly spring-pressed plungers 145 engaging with the metal tube 115 and carried in a metal block 146 to which the lower ends of the flexible leads 144 are connected. The upper contacts consist of a bundle of butt contacts 147 independently spring-pressed in a longitudinal direction so as together to constitute a self-aligning butt contact for engagement with the contact in the isolating switch chamber.

The insulated conductor can be withdrawn downwards from its operating position into an isolating position, in which it lies within the tubular compartment formed by the metal trunk 121 and the insulator 110, its upper end being below the sluice valve 131. Thus when the insulated conductor is in its isolating position, the sluice valve 131 can be closed to seal the orifice in the bottom wall of the isolating switch chamber and, if desired, the flexible bellows 123 can be detached from the valve chest 130 to permit removal of the whole circuit-breaker for overhaul or repair.

The movements of the withdrawable conductor are effected hydraulically by varying the oil pressure above and below the conductor, the metal sheath 143 on the conductor being provided with piston rings 148 so that the sheath acts as a piston movable in a cylinder constituted by the metal trunk 121. For this purpose an oil pump 150 driven by an electric motor 151 is mounted on the casing 120 and is connected by suitable ducts 152, 153 to the upper and lower ends of the tubular compartment in which the withdrawable conductor moves. The upper duct 152 opens into the transformer chamber 122 and is thus connected through the interior of the metal bellows 123 to the open upper end of the metal trunk 121. The lower duct 153 opens into the lower part of the casing 120 beneath the transformer chamber and is thus connected through openings in the flange 116 to the interior of the insulator 110, parts of the metal sheath 143 being cut away as indicated at 149 to permit the oil to flow into the lower end of the insulator 110. Thus to raise the conductor the pump 150 is started up to withdraw oil from the upper end of the trunk 121 and to drive it into the interior of the insulator 110. To lower the conductor the pump is driven in the reverse direction, the weight of the conductor assisting the movement. Alternatively a by-pass valve may be provided, which is opened to connect the two oil ducts together, the weight of the conductor being relied upon to effect the downward movement. If desired, instead of forming the sheath 143 as a piston moving in the cylinder formed by the metal trunk 121, the upper and lower parts of the tubular compartment may be separated from one another by a cup leather or sealing ring fixed in the metal trunk and embracing the insulated conductor, so that the movements of the conductor are effected after the manner of a hydraulic ram.

Whilst the oil pressure may be utilized to hold the insulated conductor in its raised operating position, it will usually be preferable to provide a mechanical latch for this purpose. A convenient construction of latch, which will hold the conductor either in its operating position or in its isolating position, is shown in Figures 6 and 9. This latch consists of a ring 160 surrounding the insulated conductor and pivoted about a vertical pin 161 at the lower end of the casing 120 at one side, the ring having two internal flanges 162 and 163 at different levels on opposite sides of the conductor. These flanges cooperate with grooves 164 and 165 in appropriate positions in the metal sheath 143 of the conductor, and to ensure correct positioning of the lower groove 165 a collar 125 is provided at the upper end of the metal trunk 121 with which the upper end of the metal sheath 143 engages when the conductor is in its raised position. The metal block 147 containing the lower contacts 145 similarly engages with a shoulder 117 at the lower end of the metal tube 115 within the insulator 110 for positioning the upper groove 164 correctly when the conductor is in the isolating position. The latch ring 160 is moved to one side of the other about its pivot 161 by a pair of spring crank arms 170 on a horizontal shaft 171 suitably mounted outside the metal sleeve 112. The shaft 171 is rotated by an operating arm 172 movable between fixed stops 173, 174 under the control of an operating rod 175 leading to the top compartment above the isolating switch chamber. Thus with the conductor held in its raised position by the engagement of the lower latch flange 163 in the lower groove 165, movement of the operating arm 172 to its other limiting position against the stop 174 will cause the spring arms 170 to release the flange 163 from the groove 165 and will hold the upper latch flange 162 spring-pressed against the surface of the metal sheath 143, so that when the conductor reaches its isolating position the upper latch flange 162 will spring into engagement in the upper groove 164, the converse latch operation taking place when the conductor is raised. The latch operating mechanism is also utilized to operate through levers 176 a number of auxiliary switches 177 housed in a box 178 on the casing 120 for indicating or interlocking purposes. The shaft of the auxiliary switches may also operate an indicator visible through a window 179 on the box 178 to indicate whether the conductor is in its operating position or in its isolating position.

A preferred arrangement of the sluice valve 131 is shown in detail in Figures 7 and 8. In this arrangement the valve is caused to slide over the orifice in the bottom wall of the isolating switch chamber by rotation of a screw-threaded shaft 132 by means of a handwheel 133. The valve shaft 132 carries a notched disc 134, with which an arm 135 carried by a spindle 136 cooperates. This spindle 136 passes up to the top compartment and is connected to part of the control mechanism for actuating the associated latch-operating rod 175, the arrangement being such that when the control mechanism is operated to cause the insulated conductor to be raised, the spindle 136 is rotated to cause the arm 135 to engage in a notch on the disc 134 and thus to prevent the handwheel 133 from being rotated to close the valve. Since the arm 135 may not always be opposite a notch in the disc 134, the spindle 136 is made of sufficient flexibility to permit it to twist when operated, so that after a slight rotation of the handwheel, the arm 135 will spring into the first notch on the disc and will thus lock the handwheel against further rotation. When the sluice valve is located on the right-hand side of the chamber, it is convenient to insert a reversing mechanism (indicated at 137 in Figures 12, 13, 17 and 18) between the spindle 136 and the arm 135 to simplify the arrangement of the operating mechanism. In order to prevent energization of the pump motor 151 to raise the insulated conductor when the sluice valve is closed, the energizing circuit to the pump motor is controlled by a rotary auxiliary switch 138 which is driven through worm gearing by the valve shaft 132 and is housed in a casing 139 carried by the valve chest 130.

The connection of a cable to a contact in an isolating switch chamber is effected by means of a cable sealing end introduced through an orifice in the bottom wall of the chamber, and a preferred cable sealing end fitting is shown in detail in Figure 11, which illustrates the arrangement of one of the intermediate isolating switch chambers 64. It should be mentioned that, in order to enable the size of the isolating switch chambers to be reduced, insulating barriers are provided in the oil therein between the contacts and the chamber walls. These insulating barriers are, for convenience, omitted from Figures 11-17 of the drawings but are shown in Figures 23 to 25 and will be described later with reference to those figures. Since the material, of which the insulating barriers are preferably made, is such that it must not be exposed to moisture in the atmosphere, it is important so to arrange the cable sealing and fittings as to avoid the necessity for draining the oil out of the chamber when inserting or removing a sealing end. For this purpose a hollow insulator 180 is mounted in an oil-tight manner over the orifice through which the sealing end 181 is inserted, and is provided with a terminal 182 at its upper end connected to the contact 72 in the chamber. The sealing end 181 itself is inserted within this insulator 180 so that spring-controlled butt contacts 183 on the end of the conductor of the cable 81 engage with the terminal 182. The sealing end 181 carries a flange 186 which can be secured to the chamber wall around the orifice with suitable insulation to isolate the cable sheath from the chamber wall. A small compartment 184 is thus enclosed between the sealing end 181 and the insulator 180, and this compartment is normally filled with oil. When it is desired to remove the sealing end, the oil is drained off from the small compartment 184 by means of a cock 185 provided on the flange 186, and the cock 185 also serves, when the sealing end is replaced, for exhausting air from the compartment 184 and refilling it with oil. It will be appreciated that the provision of this special fitting for the cable sealing end may in some instances be unnecessary, and in such instances the sealing end will project directly into the chamber without a surrounding insulator.

The manner in which the contacts and rotary switches are arranged in the isolating switch chambers will now be described, taking first the two intermediate chambers 64, 65, which are similar to one another, and one of which, say 64, is illustrated in detail in Figures 11-16 of of the drawings.

The third contact 72 in each intermediate chamber may be carried (as shown) by the hollow insulator 180 containing the cable sealing end or alternatively by an insulator secured to the top of the chamber. The contact itself is connected to the terminal 182 with which the cable sealing end 181 engages, and consists of a metal ring which is mounted on the end of the supporting insulator 180 and with which the end of the rotary isolating switch arm 91 engages.

The second contact 71 is carried on an insulator 190 secured to the top of the chamber and surrounded at its lower end by a metal ring 191 constituting the contact with which the rotary switch arm 91 engages. Beneath this ring 191 is a short cylindrical member 192, terminating in a hemispherical contact 71 with which the butt contact 147 on the upper end of the withdrawable conductor 140 engages. The cylindrical member 192 is conveniently formed in two halves and is provided with a lateral opening 193 facing towards the first contact 70. Through this opening 193 passes the rigid connecting bar 90 to the first contact, the end of the bar being carried on a central bolt 194 secured on the bottom of the insulator 190 and being connected to the cylindrical member 192 by a flexible connection 195.

The insulator 200 supporting the first contact 70 is rotatably mounted beneath the top wall of the chamber, a central spindle 201 passing up therefrom into the top compartment 210. The lower end of the insulator 200 is surrounded by a metal ring 202 from which the isolating switch arm 91 itself projects horizontally. A central bolt 203 secured to the bottom of the insulator 200 serves to carry the end of the rigid connecting bar 90 leading to the second contact 71, the bar being connected by a flexible connection 204 to a cylindrical member 205 terminating in a hemispherical end, the cylindrical member being provided with a lateral opening 206 for the connecting bar wide enough to permit a 60° rotational movement of the whole insulator and contact.

The top compartment 210 containing the operating mechanism for the rotary isolating and other switches also serves as a conservator tank for the oil, with which the isolating switch chamber and the associated parts of the switchgear are filled. Thus it is important to maintain the chamber completely filled with oil in order both to ensure the maintenance of safe clearances between the conducting members in the chamber and to prevent any admission of moisture-laden air which would injuriously affect the insulating barriers in the chamber or lower the dielectric value of the oil. At the same time it is necessary to allow for the expansion and contraction of the oil relative to that of the chamber itself as the result of temperature changes. These functions are performed by the top compartment, whose interior is in permanent communication through two very small holes 211 with the interior of the chamber itself, the oil level in the top compartment being normally at, say, a third of the height of the compartment. The communicating holes 211 are made very small, so that, whilst of sufficient size to deal with expansion and contraction of the oil due to temperature changes, they will yet allow a hydraulic pressure to be set up in the chamber. This may be necessary if, for any reason, the withdrawable conductor tends to stick in its raised position when it should move downwards, the oil pressure being raised in the chamber (irrespective of the oil level in the top compartment) to an extent sufficient to force the withdrawable conductor down. The communicating holes 211 are also so arranged as to open into the top compartment slightly above the bottom level of the compartment, in order that any moisture which may happen to condense and collect at the bottom of the compartment will not be drawn into the chamber itself. For initial filling purposes a screwdown valve 212 (Figures 13 and 15) is provided between the top compartment and the chamber, this valve being normally closed and being operated through gearing 213 by a handwheel 214 outside the chamber. Since the body of the valve 212 extends somewhat above the bottom level of the top compartment, it provides a convenient location for the small communicating holes 211. A protective covering 215 of gauze or other suitable material is provided to prevent the holes 211 from becoming choked. A small drain-cock is also provided to enable any moisture collecting in the bottom of the top compartment to be drained off.

A further valve 220 is provided for controlling the supply of oil to the top compartment 210, if for any reason the level of oil therein falls to an undesired low value, this valve being located outside the chamber at a convenient height (as shown in Figures 4 and 5) adjacent to the hand wheel 214 and communicating with the top chamber through a pipe 221. A window 222 is provided in the wall of the compartment in order to enable the oil level therein to be viewed, and an oil-level alarm indicator 223 operated by a float 224 is also provided to give an alarm when the oil level falls too low. The top compartment is completely closed except for a "breathing" device 225, which communicates with the top compartment through a pipe 226 opening above the oil level in the compartment and permits the escape and entrance of air due to temperature changes, this device being such as to ensure that any air entering the compartment is thoroughly dried.

In order to provide for earthing the outgoing cable 81 associated with the third contact 72 in the chamber, an earthing switch of the plunger type is employed (see Figures 11 and 16), and a seating 187 for the lower end 231 of the switch plunger 230 is provided within the metal ring 72 constituting the third contact. The plunger 230 normally lies within a container 232 partly in the top compartment and partly projecting above it, and moves within a hollow insulator 188 projecting down from the top of the chamber to the contact 72. The plunger 230 is housed within a sleeve 233 carrying a rack 234 driven through gearing 235 by a toothed quadrant 236 in the top compartment. Thus operation of the quadrant 236 drives the sleeve 233 downwards until the lower end 231 of the plunger engages with the seating 187 and a contact 237 at the upper end of the plunger engages with a shoulder 238 on the container 232, thus earthing the cable through the earthed metal frame of the container. In order to secure good contact the sleeve 233 is spring-connected both to the plunger 230 and to the upper contact 237. For this purpose a spring 239 is located with its end abutments 240, 241 movable between collars 242, 243 on the plunger 230 and also between internal shoulders 244, 245 on the sleeve 233, whilst a second spring 246 abuts against an internal shoulder 247 on the sleeve 233 and a collar 248 connected to the contact 237. The contact 237 is connected to the plunger 230 by a flexible lead 249. Thus with the earthing switch in the raised position shown the lower spring 239 is in compression between the collar 242 and the shoulder 245, and the upper end of the sleeve 233 abuts against the upper contact 237. When the sleeve is driven downwards by the quadrant 236, the drive to the plunger is transmitted through the shoulder 244, the spring 239 and the collar 243. At the lower end of the stroke the plunger engages with the seating 187 and the upper contact 237 engages with the earthed shoulder 238, and the sleeve 233 is driven a little further downwards to compress both springs. The spring 239 is also utilized when the switch is in the raised position to force a poppet valve 250 formed on the lower end of the plunger 230 against a seating 251 in the opening in the bottom wall of the top compartment. The purpose of this valve is to provide a seal for the chamber to enable a hydraulic pressure to be set up therein, if necessary. The upper projecting portion of the container 232 is provided with a window 252, through which an indication as to whether the cable is earthed or not is given by a rotary indicator 253. This indicator is carried on a squared rod 254 passing down within the hollow interior of the plunger 230, the rod being twisted at its lower end as shown at 255. A nut 256 on the plunger slides on the rod 254 as the plunger moves, and the twisted end of the rod ensures that the indicator is operated at the end of the downward stroke of the plunger and at the beginning of the upward stroke.

The top compartment 210 for the intermediate chamber 64 contains the operating mechanism not only for the rotary isolating switch arm 91 and the cable earthing switch plunger 230, but also for the latch devices 160 on the two withdrawable conductors 80 associated with the chamber. The compartment has a triangular extension in front of the top of the chamber, so that it is rhomboidal in plan view, as shown clearly in Figure 13, and the four operating mechanisms in the compartment are actuated respectively by four vertical spindles 260, 270, 280, 290 in line with one another in this extension.

The front spindle 260 is associated with the cable earthing switch and carries a crank arm 261 connected through a two-armed lever 262 freely pivoted about the spindle 280 to an operating rod 263 which actuates a crank arm 264 on the toothed quadrant 236. The quadrant carries a counterweight 265 to balance the weight of the moving parts of the cable earthing switch.

The second spindle 270 is associated with the latch on the withdrawable conductor connecting the left-hand circuit-breaker 60 to the chamber 64. A crank arm 271 on this spindle acts through a two-armed lever 272 carried by a shaft 273 on an operating rod 274 connected to a crank arm 275 on a short shaft 276 passing through the side wall of the compartment, a further crank arm 277 on this shaft being connected to the upper end of the latch-operating rod 175. The shaft 273 projects through the bottom of the compartment and is connected through a universal coupling 278 (Figure 4) to the interlock shaft 136 for the associated sluice valve.

The third spindle 280 is associated with the latch on the other withdrawable conductor and its crank arm 281 acts through a lever 282 and a link 283 on a crank arm 284 on a shaft 285, the drive being transmitted through a rod 286 to a short shaft 287 passing through the side wall of the compartment, and thence through a crank arm 288 to the upper end of the latch-operating rod 175. The shaft 285 passes through the bottom of the compartment and is connected through a universal coupling 289 to the interlock shaft 136 for the associated sluice valve.

The fourth spindle 290 is associated with the isolating switch arm 91 and its crank arm 291 is connected through a lever 292 pivoted at 293 and a link 294 to a crank arm 295 on the verticle spindle 201 carrying the rotary insulator 200 in the chamber.

Each of the four spindles 260, 270, 280, 290 rotates through an angle of about 100° and the operating mechanism is such that the mechanical advantage is at a maximum at the beginning and end of the movement and a dead centre effect is achieved at each end of the stroke. Besides providing a positive lock for the operating mechanism, this has the further advantage of nullifying the effect of slight errors in the angular movement of the driving spindle.

The arrangement of the two end isolating switch chambers 63, 66 differs somewhat from that of the intermediate chambers 64, 65, and Figures 17-20 illustrate the left-hand end chamber 63, the right-hand end chamber 66 being a mirror image of the chamber 63.

The third contact 77 in the end chamber 63, which is associated with the cable leading to the power transformer 83, is arranged in a manner exactly similar to the third contact 72 in the intermediate chambers, with its cable sealing end and cable earthing switch.

The second contact 76 in the end chamber is also in many respects similar to the third contact in the intermediate chamber, for in this instance the second contact is associated with the by-pass cable 84 instead of with a withdrawable conductor. The by-pass cable 84 is led into the chamber by means of a cable sealing end, which is arranged in the same manner as the cable sealing end 181 shown in Figure 11 except for the fact that the axis of the sealing end is inclined at an angle corresponding to that of the withdrawable conductors instead of being vertical. There is however no cable earthing switch associated with this contact.

The first contact 75 in the end chamber which is associated with the withdrawable conductor 82 from the end circuit-breaker 60, is however different from the first contact 70 in the intermediate chamber, since this contact carries two rotary switch arms 95, 96 instead of the single rotary arm and fixed connection, and Figures 19 and 20 show the details of the arrangement of this contact. The contact is supported on two concentric rotary insulators 300, 310 extending down from near the top of the chamber towards the contact. The inner insulator 310 is connected to a spindle 311 lying within a tube 301 constituting the spindle of the outer insulator 300, both spindles passing through into the top compartment 210. At its lower end the outer insulator 300 carries a metal ring 302 from which projects the upper isolating switch arm 96. The inner insulator 310 passes through ball bearings 312 in the ring 302 and itself carries at its lower end a small metal ring 313 from which the lower isolating switch arm 95 projects. A stud 314 in the lower end of the inner insulator is supported in ball bearings 315 in the contact 75, which is in the form of a hemispherical end to a cylindrical member 303 carried by the metal ring 302. This member 303 has a lateral orifice 304, through which the lower isolating switch arm 95 projects, the orifice being wide enough to permit a 60° relative movement between the two switch arms 95, 96. The small metal ring 313 is connected to the cylindrical member 303 by a flexible lead 316.

The top compartment 210 of the end chamber 63 is for the most part similar to that of the intermediate chamber and the same reference numerals are employed. The operating mechanism however is modified to suit the different switches to be controlled. As for the intermediate chamber, there are four controlled switches, but instead of one rotary switch and two withdrawable conductors, there are two rotary switches and one withdrawable conductor, in addition to the cable earthing switch. There are again four vertical spindles in the front extension of the compartment, and the front spindle 260 operates the cable earthing switch through mechanism identical with that employed in the intermediate chamber.

The second spindle 320 operates through a crank arm 321, a lever 322 on a shaft 323, a rod 324 and a crank arm 325 on a short shaft 326 passing through the side wall of the compartment, a crank arm 327 on this shaft 326 actuating the operating rod 175 of the latch on the associated withdrawable conductor. The shaft 323 passes through the bottom wall of the compartment and is connected through a universal coupling to the interlocking shaft 136 for the sluice valve.

The third spindle 330 is connected through a crank arm 331, a lever 332 pivoted at 333 and a link 334 to a crank arm 335 on the spindle 311 of the inner insulator 310, for operating the rotary isolating switch arm 95.

The fourth spindle 340 is similarly connected through a crank arm 341, a lever 342 also pivoted at 333, and a link 344 to a crank arm 345 on the spindle 301 of the outer insulator 300, for operating the isolating switch arm 96.

The four vertical spindles 260, 270, 280, 290 (or 260, 320, 330, 340) in each isolating switch chamber are connected by universal joints 351 below the bottom of the extension of the top compartment to four vertical shafts 350 (Figures 4, 5 and 11) which extend right down to near ground level. At the bottom of each shaft 350 is a flange 352 provided with a number of equally spaced holes 353 (Figures 5 and 22), which is bolted to a similar flange 354 with a slightly different set of equally spaced holes on a short shaft 355 projecting upwards from the trench 58, the arrangement being such as to provide a vernier adjustment for the relative angular positions of the shafts. The four short shafts 355 are respectively connected by crank levers 356 on self-aligning bearings to four pairs of rods 357 extending along the trench 58 and serving to couple together the corresponding operating mechanisms in the three phases. The four pairs of rods 357 are connected respectively to four levers 358 on a single vertical shaft 359 at the front end of the trench just behind the control pedestal 56.

Figures 21 and 22 illustrate one of the control pedestals 56, namely that associated with the intermediate chamber 64. Within the pedestal are four vertical spindles 370, 360, 390, 380. The second vertical spindle 360 is connected through lever and link mechanism 361 to the uppermost of the levers 358 and thence to the front vertical spindle 260 for operating the cable earthing switch. The first spindle 370 is connected through mechanism 371 to the second of the levers 358 and thence to the second spindle 270 for operating one of the latches. The fourth spindle 380 is connected through mechanism 381 to the third of the levers 358 and thence to the third spindle 280 for operating the other latch, and the third spindle 390 is connected through mechanism 391 to the lowermost of the levers 358 and thence to the rear spindle 290 for operating the rotary isolating switch arm 91.

Each of the four spindles 360, 370, 380, 390 is provided at its upper end above the top of the pedestal with a socket 401, into which a removable actuating handle 400 can be inserted when it is desired to operate the various switches. Thus rotation of one of the spindles through, say, 100° by the handle 400 will cause the simultaneous operation of the appropriate switches in the three phases. A lug 402 is provided on the top of the pedestal, to which projections 403 on the spindle can be padlocked to hold the spindle locked in its operative positions, and the spindle carries two blocks 404 bearing appropriate markings, which are exposed through a window 405 respectively in the two positions of the spindle, in order to give an indication as to whether the associated switches are closed or open. Each spindle also carries a crank arm 410 acting through a lever 411 on a crank arm 412 carried by a rotary contact member 413 which engages with spring contact fingers 414, 415 in the two positions of the spindle.

As has already been mentioned, the movement of each withdrawable conductor is effected by a motor-driven pump 150, and operation of the vertical spindle 370 or 380 associated with a group of withdrawable conductors not only releases the latch devices 160 of the conductors but also causes the energization of the pump motors 151 by means of the contacts 413, 414, 415 operated by the spindle 370 or 380. The energizing circuit of each pump motor 151 is taken through one of the auxiliary switches 177 operated by the associated latch 160. It may be mentioned that the corresponding pump motors 151 in the three phases are connected in parallel and they all continue to run until the movements of all three conductors are completed. If one conductor happens to finish its stroke before the other two, the oil is by-passed by a spring-loaded valve incorporated in the pump and operative when a predetermined oil pressure is exceeded. This applies both to the upward and to the downward movements of the conductors.

The pump motor energizing circuit is also controlled by the interlock switch 138 operated by the corresponding sluice valve 131, so that the conductor cannot be moved unless the sluice valve is fully open.

Since it is important to prevent closing of a group of circuit-breakers unless the associated withdrawable conductors are all in the "down" position or all in the "up" position the energizing circuit for the contactor controlling the solenoid for operating the circuit-breakers is taken through contacts 413, 414, 415 operated by the appropriate spindles 370 or 380 and also through latch-operated auxiliary switches 177.

It is also necessary to provide further interlocks between the operating mechanisms for the withdrawable conductors, the rotary isolating switches, the cable earthing switches and the main circuit-breakers in order to prevent operation of any of them when the others are in a condition inappropriate to such operation. This may be effected by providing suitable mechanical interlocks between the various spindles in the control pedestals or electrically or by a combined mechanical and electrical interlocking system. In the example illustrated a mechanical interlock is employed for the cable earthing switches, whilst the other interlocks are effected electrically. For this purpose each spindle, other than the cable earthing switch spindle 360, carries a slotted disc 420, with which a latching projection 421 on a lever 422 operated by the armature 423 of an electromagnet 424 engages to hold the spindle in one or other of its two operative positions. A push-button switch 425 is preferably provided to control the energizing circuit of each latch electromagnet 424. Thus when a spindle is to be actuated, the associated push-button switch 425 is depressed, and if the interlock contacts in the circuit are all closed the electromagnet withdraws the latch projection 421 and leaves the spindle free to be operated by the handle 400. The push-button switch is provided to avoid constant energization of the latch magnet. An indicator 426 showing through a window 427 is operated through a link 428 from the latching lever 422 in order to give an indication whether the spindle is free or locked. Stops 429 are provided with which shoulders on the disc 420 engage to limit rotation of the spindle and ensure proper engagement of the projection 421 in the slots.

The interlock for the cable earthing switch is afforded by means of two cam discs 362, 392 on the spindles 360, 390 respectively associated with the cable earthing switch and the rotary isolating switch arm 91. These cams interengage to prevent the cable earthing switch spindle 360 from being moved to the earthing position, unless the isolating switch spindle 390 has first been operated to move the switch arm 91 out of engagement with the third contact 72.

The control pedestal for an end isolating switch chamber is generally similar to that for an intermediate isolating switch chamber, with the exception that the spindle 380 controls the second rotary isolating switch instead of a withdrawable conductor. This necessitates the provision of a third interlocking cam on this spindle for the cable earthing switch interlock; this cam interengaging with the cam 392 to ensure that the third contact 77 is completely isolated before the cable can be earthed. This interlock also prevents the lower isolating switch arm 95 from being moved to engage with the third contact 77 unless the upper arm 96 is also in engagement with the contact 77, thus rendering it unnecessary for the lateral opening 304 in the cylindrical member 303 (Figure 20) to extend for a greater angle of movement than 60°.

Figures 23–25 show the manner in which the insulating barriers are arranged in the isolating switch chambers. Since the arrangement of the barriers is identical in all the isolating switch chambers, it will suffice to describe the arrangement in one chamber only, say the end chamber 63. These barriers 431—436 are provided to enable the size of the chamber to be reduced and consist of thin sheets of solid insulating material having a specific inductive capacity approximately the same as that of the oil itself, so that the distribution of the electrostatic stress is almost unaffected by the presence of the barriers. The sheets are curved to suit the shape of the chamber and lie parallel to one another around the chamber with narrow intervening spaces. The sheets are made of such breadth that they will each extend from near the middle of one of the side walls of the chamber to near the middle of the next side wall, so that three sheets will form one complete barrier around the chamber with their edges slightly overlapping one another as shown at 440. The number of barriers employed will depend on the conditions of the installation, but in the arrangement illustrated six barriers are used. The barriers are equally spaced apart with the outermost barrier 431 close to the side walls of the chamber. The sheets of the two innermost barriers 435, 436 have their edges bent over at right angles to the main surfaces of the barriers as indicated at 441, instead of overlapping one another, so that these edges project towards the centre of the chamber. The sheets are held in position at their edges near the middle of the side walls of the chamber; the outer four barriers 431, 432, 433, 434 being held by bolts or studs 443 at the top and bottom to a framework 442 within the chamber, whilst the inner two barriers 435, 436 have slots cut in their top and bottom edges, in which engage metal strips 445 carried by brackets 444 on the framework 442, these strips thus serving also to hold the bentover edges 441 in place. Spacing strips 446 of similar insulating material are also provided where necessary to hold the sheets in their proper relative positions.

Adjacent to the central parts of the side walls of the chamber the barriers extend for the full height of the chamber, but in the corners of the chamber parts of the barriers are cut away adjacent to the insulators supporting the contacts 75, 76, 77 in the chamber. The extent of the cutaway portions is different for the different barriers. Thus for instance the outer two barriers 431, 432 may be left of the full length at the corners, whilst the innermost barrier 436 is cut away to a distance equal to, say, a half or two-thirds of the length of the adjacent insulator, and the intervening barriers 435, 434, 433 are cut away by progressively decreasing amounts.

Whilst the barriers have relatively little effect on the distribution of the electrostatic stress in the oil, they yet have what may be regarded as a stratifying effect on the medium, since they considerably increase the resistance offered to a flash-over in a direction at right angles to their surfaces. Thus the provision of the barriers enables the horizontal cross-section of the chamber to be considerably reduced, since the contacts 75, 76, 77 may be located much closer to the side walls of the chamber without decreasing the safety of the installation. On the other hand the barriers tend to reduce the resistance of the insulating medium to a flash-over parallel to the surfaces of the barriers owing to surface leakage along such surfaces. The barriers are so shaped as to lie as far as possible in equipotential surfaces in order to reduce the tendency to surface leakage. Risk of flash-over between two contacts in the chamber along the surfaces of the barriers is however minimized by interrupting the surfaces of the barriers adjacent to the mid-points of the side walls of the chamber and also by curving over the edges of the sheets at the interruptions as at 441 in the manner above described. The barriers are cut away at the corners in order to interrupt the surface flash-over path from the contacts to the top and bottom walls of the chamber.

The barriers are preferably made of a fibrous material (such for example as compressed paper or cardboard or compressed wood pulp) which will readily absorb oil and in the impregnated condition will have a specific inductive capacity approximately the same as that of the oil. With this arrangement it is necessary to eliminate all traces of occluded moisture, and to this end the barriers are subjected to a lengthy heat treatment before the isolating switch chamber is brought into use. Thus the chamber with the barriers in position therein is heated under reduced pressure for a period of a few days. This treatment ensures the extraction of all moisture from the barriers and from the chamber itself. At the same time the oil with which the chamber is to be filled is dried by maintaining it at a similar temperature under vacuum, and at the end of the process the dry oil is drawn into the chamber through the filling valve and completely impregnates the barriers. In the condition of extreme dryness thus achieved the oil and the barriers have a high affinity for moisture, and it is consequently necessary to avoid all exposure of the oil to the moisture-laden atmosphere during erection of the chamber and also subsequently when the switchgear is in operation, in order to avoid repetition of the drying process. For this purpose, as already mentioned, the chamber is maintained full of oil by means of the conservator tank constituted by the top compartment 210 and the various external connections to the chamber are arranged to avoid the necessity for exposing the oil to the atmosphere.

It will be appreciated that the above arrangement has been described by way of example only, and may be modified in a variety of ways within the scope of the invention. Thus for example for lower voltage installations it may be more convenient to combine the corresponding circuit-breakers in the three phases into a single three-phase circuit-breaker with the various contacts all enclosed within a single oil tank and similarly to combine together the three isolating switch chambers in each group into a single chamber. With this modification a single sluice valve having three ports may be employed in place of the three associated sluice valves, or alternatively other forms of sealing device for the openings in the chamber walls may be used. Again the particular switchgear layout described employs three main circuit-breakers in each phase in what may be termed mesh formation. It will be clear that this layout can readily be extended to employ a larger number of circuit-breakers, and an arrangement having, say, five circuit-breakers in mesh formation can for most purposes be regarded as the equivalent of an ordinary duplicate busbar arrangement with six circuit-breakers. The invention is also applicable to switchgear layouts of other kinds by departing from the mesh formation of the circuit-breakers.

The insulating barrier arrangement shown in Figures 23—25 may also be applied to other constructions of isolating switch chamber. Thus for instance Figures 26 and 27 show a simple form of isolating switch chamber 450 containing two contacts 460, 470 respectively supported on insulators 461, 471 which project from the top wall 451 of the chamber and contain the conductors 462, 472 leading to the contacts. An isolating switch 480 of the knife blade type is pivoted about the contact 460 so that it can move in a vertical plane into engagement with the contact 470 or with an earthing contact 481 on the base plate 452 of the chamber. The blade 480 is operated through a link 482 from a crank arm 483 on a horizontal shaft 484 journalled in a recess 453 of the top plate 451, and the operating mechanism for the shaft 484 may be contained in a top compartment 454 also serving as a conservator tank for the oil in the chamber 450.

The chamber 450 may be of generally oval cross-section with flat side walls parallel to the plane of movement of the switch blade 480 and in this case the spaced insulating barriers 491, 492, 493, 494, 495 may each be formed of two sheets extending close to the walls of the chamber from near the middle of one side wall to near the middle of the other side wall. The edges of the outer barriers 491, 492 overlap one another at 500 and those of the inner barriers 493, 494, 495 are curved inwardly towards the plane of movement of the switch blade 480 as shown at 501. The vertical lengths of the barriers decrease progressively from the outer barrier 491 to the inner barrier 495 in a manner analogous to that described above for the barriers in the arrangement of Figures 23—25. Spacing strips 502 of insulating material are provided between the barriers, these strips being similar to the strips 445 in the preceding arrangement, except that they are in this instance formed as S-shaped hooks to hold the barriers in position.

It will be appreciated that the insulating barriers may be arranged in other ways and may be applied to other forms of isolating switch chamber.

What I claim as my invention and desire to secure by Letters Patent is:—

1. In metal-clad electric switchgear, the combination with a main circuit-breaker, of an isolating switch chamber comprising a metal casing, three contacts, insulators for supporting the contacts within the metal casing of the chamber, a rotary isolating switch carried by the first contact and movable into engagement either with the second contact or with the third contact, means for operating the rotary isolating switch, an insulated conductor normally serving to connect one of the three contacts with a contact of the main circuit-breaker, means whereby such insulated conductor can be moved longitudinally to break the connection to the main circuit-breaker, and insulated conductors passing through the casing of the chamber for connecting the other two contacts to external circuits.

2. In metal-clad electric switchgear, the combination with two main circuit-breakers, of an isolating switch chamber comprising a metal casing, three contacts, insulators for supporting the contacts within the metal casing of the chamber, a rotary isolating switch carried by the first contact and movable into engagement either with the second contact or with the third contact, means for operating the rotary isolating switch, an insulated conductor normally serving to connect the first contact with a contact of one main circuit-breaker, an insulated conductor normally serving to connect the second contact with a contact of the other main circuit-breaker, means whereby such insulated conductors can be moved longitudinally to break the connections to the main circuit-breakers, and means for connecting the third contact to an external circuit.

3. In metal-clad electric switchgear, the combination with two main circuit-breakers, of an isolating switch chamber comprising a metal casing, three contacts, insulators for supporting the contacts within the metal casing of the chamber, a rotary isolating switch carried by the first contact and movable into engagement either with the second contact or with the third contact, means for operating the rotary isolating switch, means additional to the rotary isolating switch for permanently connecting the first and second contacts together, an insulated conductor normally serving to connect the first contact with a contact of one main circuit-breaker, an insulated conductor normally serving to connect the second contact with a contact of the other main circuit-breaker, means whereby such insulated conductors can be moved longitudinally to break the connections to the main circuit-breakers, an external cable circuit, and a cable sealing end for connecting the third contact to the external cable circuit.

4. In metal-clad electric switchgear, the combination with a main circuit-breaker, of an isolating switch chamber comprising a metal casing, three contacts, insulators for supporting the contacts within the metal casing of the chamber, a rotary isolating switch carried by the first contact and movable into engagement either with the second contact or with the third contact, means for operating the rotary isolating switch, an insulated conductor normally serving to connect the first contact with a contact of the main circuit-breaker, means whereby such insulated conductor can be moved longitudinally to break the connection to the main circuit-breaker, external cable circuits, and cable sealing ends respectively for connecting the second and third contacts to the external cable circuits.

5. The combination with the features set forth in claim 4, of a second rotary isolating switch mounted on the first contact and movable into engagement either with the second contact or with the third contact, and means for operating the second rotary isolating switch independently of the first.

6. In metal-clad electric switchgear, the combination with two main circuit-breakers, of two isolating switch chambers respectively associated with the main circuit-breakers and each having a metal casing, three contacts in each isolating switch chamber, insulators for supporting the contacts within the metal casings of the chambers, two rotary isolating switches carried by the first contact in each chamber and each movable into engagement either with the second contact or with the third contact, means for operating the rotary isolating switches independently of one another, an insulated conductor normally serving to connect the first contact in each chamber with a contact of the associated main circuit-breaker, means for moving such insulated conductor longitudinally to break the connection to the circuit-breaker, means for connecting the second contact in one chamber to the second contact in the other chamber, and means for connecting the third contact in each chamber to an external circuit.

7. In metal-clad electric switch gear, the combination with a group of main circuit-breakers arranged in line with one another, of an isolating switch chamber between each pair of consecutive circuit-breakers and a further isolating switch chamber at each end of the line each chamber having a metal casing, three contacts in each isolating switch chamber, insulators for supporting the contacts within the metal casings of the chambers, a rotary isolating switch carried by the first contact in each chamber and movable into engagement either with the second contact or with the third contact, an insulated conductor normally serving to connect the first contact in each chamber with a contact of an adjacent main circuit-breaker but movable longitudinally to break such connection, an insulated conductor normally serving to connect the second contact in each intermediate chamber with a contact of the other adjacent main circuit-breaker but movable longitudinally to break such connection, means additional to the rotary isolating switch for connecting together the first and second contacts of each intermediate chamber, a second rotary isolating switch carried by the first contact of each end chamber and movable into engagement either with the second contact or with the third contact, means for operating the rotary isolating switches and the longitudinally movable insulated conductors, means for connecting the second contact of one end chamber with that of the other end chamber, and means for connecting the third contact of each chamber to an external circuit.

8. In metal-clad electric switchgear, an isolating switch chamber comprising a metal casing of generally prismatic shape mounted approximately vertically, three contacts, insulators for supporting the contacts at an intermediate height within the chamber, a rotary isolating switch carried by the first contact and movable about an approximately vertical axis into engagement either with the second contact or with the third contact, a separate compartment at the top of the chamber, operating mechanism for the isolating switch in the top compartment, and insulated conductors passing through the base of the chamber for connecting the three contacts to external circuits.

9. In metal-clad electric switchgear, the combination with a main circuit-breaker, of an isolating switch chamber comprising a metal casing, three contacts, insulators for supporting the contacts at an intermediate height within the chamber, a rotary isolating switch carried by the first contact and movable about an approximately vertical axis into engagement either with the second contact or with the third contact, an insulated conductor passing through the base of the chamber and normally serving to connect the first contact with a contact of the main circuit-breaker, means whereby such insulated conductor can be moved longitudinally to break the connection to the main circuit-breaker, a latch device for permitting or preventing movement of the conductor, a separate compartment at the top of the chamber, operating mechanism in the top compartment for the isolating switch and for the latch device, and insulated conductors passing through the base of the chamber for connecting the second and third contacts to external circuits.

10. In metal-clad electric switchgear, the combination with two main circuit-breakers, of an isolating switch chamber comprising a metal casing, three contacts, insulators for supporting the contacts at an intermediate height within the chamber, a rotary isolating switch carried by the first contact and movable about an approximately vertical axis into engagement either with the second contact or with the third contact, an insulated conductor passing through the base of the chamber and normally serving to connect the first contact with a contact of one main circuit-breaker, an insulated conductor passing through the base of the chamber and normally serving to connect the second contact with a contact of the other main circuit-breaker, means whereby such insulated conductors can be moved longitudinally to break the connections to the main circuit-breakers, a latch device associated with each insulated conductor for permitting or preventing movement thereof, a cable sealing end for connecting the third contact through the base of the chamber to an external cable circuit, a switch for earthing the third contact, a separate compartment at the top of the chamber, and operating mechanism in the top compartment for the isolating and cable earthing switches and for the two latch devices.

11. In metal-clad electric switchgear, the combination with a main circuit-breaker, of an isolating switch chamber comprising a metal casing, three contacts, insulators for supporting the contacts at an intermediate height within the chamber, two rotary isolating switches carried by the first contact and independently movable about an approximately vertical axis into engagement either with the second contact or the third contact, an insulated conductor passing through the base of the chamber and normally serving to connect the first contact to a contact of the main circuit-breaker, means whereby such insulated conductor can be moved longitudinally to break the connection to the main circuit-breaker, a latch device for permitting or preventing movement of the insulated conductor, means for connecting the second contact through the base of the chamber to an external circuit, a cable sealing end for connecting the third contact through the base of the chamber to an external cable circuit, a switch for earthing the third contact, a separate compartment at the top of the chamber, and operating mechanism in the top compartment for the isolating and cable earthing switches and for the latch device.

12. In metal-clad electric switchgear, an isolating switch chamber comprising an earthed metal casing, a separate compartment on the top of the casing, three contacts mounted at an intermediate height within the chamber casing, a rotatable insulator projecting down from the top of the casing for supporting the first contact, an insulator for supporting the second contact, two hollow insulators projecting respectively from the top and from the base of the casing for supporting the third contact, an isolating switch carried by the first contact and movable by rotation of the supporting insulator into engagement either with the second contact or with the third contact, a cable sealing end within the lower hollow insulator for connecting the third contact to an external cable circuit, means passing through the base of the chamber for connecting the first and second contacts to external circuits, a cable earthing switch consisting of a conductor normally housed in the top compartment but movable longitudinally within the upper hollow insulator into a position in which it connects the third contact to a part of the earthed metal casing, and means within the top compartment for rotating the insulator supporting the isolating switch and for effecting the longitudinal movements of the cable earthing switch conductor.

13. In metal-clad electric switchgear, an isolating switch chamber comprising a metal casing filled with insulating liquid, three contacts within the chamber, a hollow insulator in liquid-tight engagement with the casing around an orifice therein for supporting one of the contacts, insulators for supporting the other two contacts, means for connecting such contacts to external circuits, at least one isolating switch controlling the connections between the contacts within the chamber, a cable sealing and detachably mounted on the casing so as to project through the orifice into the hollow insulator and to connect the contact thereon to an external cable circuit, and means whereby the space within the hollow insulator around the cable sealing end can be filled with insulating liquid or can be emptied to permit the cable sealing end to be detached from the casing without draining the insulating liquid from the interior of the casing itself.

14. In metal-clad electric switchgear, the combination with a main circuit-breaker, of an isolating switch chamber comprising a metal casing filled with insulating liquid, three contacts within the chamber, insulators for supporting the first and second contacts, a hollow insulator in liquid-tight engagement with the casing around an orifice therein for supporting the third contact, a cable sealing and detachably mounted on the casing so as to project through the orifice into the hollow insulator and to connect the third contact to an external cable circuit, means whereby the space within the hollow insulator around the cable sealing end can be filled with insulating liquid or can be emptied to permit the cable sealing end to be detached from the casing without draining the insulating liquid from the interior of the casing, an insulated conductor passing through an orifice in the casing and normally serving to connect the first contact with a contact of the main circuit-breaker, means whereby such insulated conductor can be moved longitudinally to isolate the first contact from the circuit-breaker and can be withdrawn completely from the casing, means for sealing the orifice in the casing when the insulated conductor has been withdrawn, at least one isolating switch controlling the connections between the contacts within the chamber, and means for connecting the second contact to an external circuit.

15. The combination with the features set forth in claim 14, of a separate compartment at the top of the isolating switch chamber, operating mechanism in the top compartment for the isolating switch, and means whereby the top compartment serves as a conservator tank for maintaining the chamber filled with the insulating liquid and for permitting expansion and contraction of the liquid as the result of temperature changes.

16. The combination with the features set forth in claim 8, of means whereby the top compartment also acts as a conservator tank for maintaining the isolating switch chamber filled with insulating liquid and for permitting expansion and contraction of the liquid due to temperature changes.

17. In a metal-clad electric switchgear, the combination with a main circuit-breaker, of an isolating switch chamber comprising a metal casing filled with insulating liquid, contacts within the chamber, an insulated conductor normally serving to connect one of the contacts with a contact of the main circuit-breaker, hydraulically operated means whereby such insulated conductor can be moved longitudinally to break the connection to the main circuit-breaker, at least one isolating switch for controlling the connection between the contacts in the chamber, operating mechanism for such isolating switch, and a separate compartment at the top of the chamber containing the operating mechanism and communicating with the interior of the chamber through at least one small hole, the communication being such that the top compartment acts as a conservator tank for maintaining the chamber filled with the insulating liquid and for permitting expansion and contraction of the liquid due to temperature changes whilst yet enabling a hydraulic pressure to be set up within the chamber for effecting movement of the insulated conductor.

18. The combination with the features set forth in claim 17, of a latch device for permitting or preventing movement of the insulated conductor, and mechanism contained in the top compartment for operating the latch device.

19. The combination with the features set forth in claim 10, of means whereby the top compartment also acts as a conservator tank for maintaining the isolating switch chamber filled with insulating liquid and for permitting expansion and contraction of the liquid due to temperature changes.

20. The combination with the features set forth in claim 11, of means whereby the top compartment also acts as a conservator tank for maintaining the isolating switch chamber filled with insulating liquid and for permitting expansion and contraction of the liquid due to temperature changes.

21. In metal-clad electric switchgear, the combination of an electrical apparatus forming part of the switchgear, a metal casing in which the apparatus is immersed in insulating liquid, and spaced barriers of solid insulating material inserted in the insulating liquid between the apparatus and the walls of the metal casing, the inner barrier being interrupted to break the surface flash-over path between conducting parts of the apparatus which may be at different potentials, and having its edges bent over at the interruptions to project inwardly into the casing at an angle to the surfaces of the barriers, while at least one of the outermost barriers lies between the walls of the casing and the gaps formed by the interruptions in the innermost barrier.

22. In metal-clad electric switchgear, an isolating switch chamber comprising a metal casing filled with insulating liquid, insulators projecting inwardly from the end walls of the casing, contacts supported on such insulators, at least one isolating switch for controlling the connection between the contacts within the chamber, and spaced barriers of solid insulating material inserted in the insulating liquid between the contacts and the side walls of the casing, at least one of the innermost barriers being provided with interruptions intermediate between points adjacent to the contacts to break the surface flash-over path between such contacts, and having its edges bent over at the interruptions to project inwardly into the casing at an agle to the surfaces of the barriers, while at least one of the outermost barriers lies between the walls of the casing and the gaps formed by the interruptions in the innermost barrier.

23. In a metal-clad electric switchgear, the combination of a metal casing filled with insulating liquid, insulators projecting inwardly from the end walls of the casing, an electrical apparatus supported on such insulators within the casing and having conducting parts which may be at different potentials, and spaced barriers of solid insulating material inserted in the insulating liquid between the apparatus and the side walls of the casing, at least one of the outermost barriers extending around the whole interior of the casing and being formed in sections whose edges overlap to form a substantially continuous barrier while the barriers are cut away in the neighbourhood of the supporting insulators, the extent of the cut-away portions being greatest on the innermost barrier and progressively decreasing to the outermost barrier.

24. In metal-clad electric switchgear, the combination of an electrical apparatus forming part of the switchgear, a metal casing in which the apparatus is immersed in insulating liquid, and spaced barriers of solid insulating material inserted in the insulating liquid between the apparatus and the walls of the casing, at least one of the innermost barriers being provided with interruptions intermediate between points adjacent to conducting parts of the apparatus which may be at different potentials and having its edges bent over at the interruptions to project inwardly into the casing at an angle to the surfaces of the barriers while at least one of the outermost barriers extends around the whole interior of the casing and is formed in sections whose edges overlap to form a substantially continuous barrier.

25. In metal-clad electric switchgear, an isolating switch chamber compriisng a metal casing filled with insulating liquid, insulators projecting inwardly from the end walls of the casing, contacts supported on such insulators, at least one isolating switch for controlling the connection between the contacts within the chamber, and spaced barriers of solid insulating material inserted in the insulating liquid between the contacts and the side walls of the casing, at least one of the outermost barriers extending around the whole interior of the casing and being formed in sections whose edges overlap to form a substantially continuous barrier while the barriers are cut away in the neighbourhood of the supporting insulators the extent of the cut-away portions being greatest on the innermost barrier and progressively decreasing to the outermost barrier.

26. In metal-clad electric switchgear, an isolating switch chamber comprising a metal casing filled with insulating liquid, contacts within the chamber, means passing through the casing for connecting the contacts to external circuits, at least one isolating switch for controlling the connection between the contacts in the chamber, operating mechanism for such isolating switch, a separate compartment at the top of the chamber which serves not only to contain the operating mechanism but also as a conservator tank for maintaining the chamber filled with the insulating liquid and for permitting expansion and contraction of the liquid as the result of temperature changes and spaced barriers of solid insulating material inserted in the insulating liquid between the contacts and the side walls of the casing, at least one of the innermost barriers being provided with interruptions intermediate between points adjacent to the contacts to break the surface flash-over path between such contacts.

27. In metal-clad electric switchgear, the combination of an electrical apparatus forming part of the switchgear, a metal casing in which the apparatus is immersed in insulating liquid, liquid-tight insulators projecting upwardly from the base of the chamber and containing the electrical connections from the apparatus to external circuits, a separate compartment at the top of the casing serving as a conservator tank for maintaining the casing filled with insulating liquid and for permitting expansion and contraction of the liquid due to temperature changes, and spaced barriers of solid insulating material inserted in the insulating liquid between the apparatus and the side walls of the casing, at least one of the innermost barriers being provided with interruptions intermediate between points adjacent to conducting parts of the apparatus which may be at different potentials and having its edges bent over at the interruptions to project inwardly into the casing at an angle to the surfaces of the barriers, whilst the barriers are cut away in the neighbourhood of the supporting insulators the extent of the cut-away portions progressively decreasing from the innermost barrier to the outermost barrier.

28. The combination with the features set forth in claim 1, of insulating liquid filling the isolating switch chamber, and spaced barriers of solid insulating material inserted in the insulating liquid between the contacts and the side walls of the casing, at least one of the innermost barriers being provided with interruptions intermediate between points adjacent to the contacts and having its edges bent over at the interruptions to project inwardly into the chamber at an angle to the surfaces of the barriers.

29. The combination with the features set forth in claim 13, of a separate compartment at the top of the insolating switch chamber serving as a conservator tank for maintaining the chamber filled with insulating liquid and for permitting expansion and contraction of the liquid due to temperature changes, and barrires of solid insulating material inserted in the insulating liquid between the contacts and the side walls of the casing, at least one of the innermost barriers being provided with interruptions intermediate between points adjacent to the contacts and having its edges bent over at the interruptions to project inwardly into the casing at an angle to the surfaces of the barriers, whilst the barriers are cut away in the neighbourhood of the supporting insulators the extent of the cut-away portions being greatest on the innermost barrier and progressively decreasing to the outermost barrier.

30. The combination with the features set forth in claim 8, of insulating liquid filling the isolating switch chamber, and spaced barriers of solid insulating material inserted in the insulating liquid between the contacts and the side walls of the casing, at least one of the innermost barriers being provided with interruptions intermediate between points adjacent to the contacts to break the surface flash-over path between such contacts.

31. The combination with the features set forth in claim 8, of means whereby at least one of the insulated conductors passing through the base of the chamber can be moved longitudinally to isolate the associated contact from the external circuit and can be withdrawn completely from the chamber, means for sealing the orifice in the base of the chamber through which the movable insulated conductor is withdrawn, and means whereby the top compartment also acts as a conservator tank for maintaining the isolating switch chamber filled with insulating liquid and for permitting expansion and contraction of the liquid due to temperature changes.

32. The combination with the features set forth in claim 12, of means whereby the top compartment also acts as a conservator tank for maintaining the isolating switch chamber filled with insulating liquid and for permitting expansion and contraction of the liquid due to temperature changes.

33. The combination with the features set forth in claim 13, of a switch for earthing the contact associated with the cable sealing end, a separate compartment at the top of the isolating switch chamber, operating mechanism in the top compartment for the isolating and cable earthing switches, and means whereby the top compartment also acts as a conservator tank for maintaining the isolating switch chamber filled with insulating liquid and for permitting expansion and contraction of the liquid due to temperature changes.

ARCHIBALD ALLAN.